US010019816B2

(12) United States Patent
Venkataraman et al.

(10) Patent No.: US 10,019,816 B2
(45) Date of Patent: Jul. 10, 2018

(54) SYSTEMS AND METHODS FOR DECODING IMAGE FILES CONTAINING DEPTH MAPS STORED AS METADATA

(71) Applicant: FotoNation Cayman Limited, San Jose, CA (US)

(72) Inventors: Kartik Venkataraman, San Jose, CA (US); Semyon Nisenzon, Palo Alto, CA (US); Dan Lelescu, Morgan Hill, CA (US)

(73) Assignee: FotoNation Cayman Limited, San Jose, CA (US)

( * ) Notice: Subject to any disclaimer, the term of this patent is extended or adjusted under 35 U.S.C. 154(b) by 0 days.

(21) Appl. No.: 15/396,024

(22) Filed: Dec. 30, 2016

(65) Prior Publication Data
US 2017/0178363 A1 Jun. 22, 2017

Related U.S. Application Data

(63) Continuation of application No. 14/667,492, filed on Mar. 24, 2015, now Pat. No. 9,536,166, which is a
(Continued)

(51) Int. Cl.
*G06K 9/36* (2006.01)
*G06T 9/20* (2006.01)
(Continued)

(52) U.S. Cl.
CPC ............... *G06T 9/20* (2013.01); *G06T 7/596* (2017.01); *G06T 15/08* (2013.01);
(Continued)

(58) Field of Classification Search
CPC ....... G06K 9/36; G06T 3/4007; G06T 3/4053; G06T 15/08; G06T 2207/10052;
(Continued)

(56) References Cited

U.S. PATENT DOCUMENTS 4,124,798 A * 11/1978 Thompson ............. G02B 23/12
250/214 VT
4,198,646 A * 4/1980 Alexander ........ H01L 27/14875
250/338.4
(Continued)

FOREIGN PATENT DOCUMENTS

CN 1669332 A 9/2005
CN 1839394 A 9/2006
(Continued)

OTHER PUBLICATIONS

US 8,957,977, 02/2015, Venkataraman et al. (withdrawn)
(Continued)

*Primary Examiner* — Amir Alavi
(74) *Attorney, Agent, or Firm* — KPPB LLP

(57) ABSTRACT

Systems and methods in accordance with embodiments of the invention are configured to render images using light field image files containing an image synthesized from light field image data and metadata describing the image that includes a depth map. One embodiment of the invention includes a processor and memory containing a rendering application and a light field image file including an encoded image, a set of low resolution images, and metadata describing the encoded image, where the metadata comprises a depth map that specifies depths from the reference viewpoint for pixels in the encoded image. In addition, the rendering application configures the processor to: locate the encoded image within the light field image file; decode the encoded image; locate the metadata within the light field image file; and post process the decoded image by modifying the pixels based on the depths indicated within the depth map and the set of low resolution images to create a rendered image.

25 Claims, 19 Drawing Sheets

Related U.S. Application Data continuation of application No. 14/504,687, filed on Oct. 2, 2014, now Pat. No. 9,042,667, which is a continuation of application No. 14/477,374, filed on Sep. 4, 2014, now Pat. No. 9,036,931, which is a continuation of application No. 13/955,411, filed on Jul. 31, 2013, now Pat. No. 8,831,367, which is a continuation of application No. 13/631,736, filed on Sep. 28, 2012, now Pat. No. 8,542,933.

(60) Provisional application No. 61/540,188, filed on Sep. 28, 2011.

(51) Int. Cl.
  *H04N 13/00* (2018.01)
  *H04N 13/02* (2006.01)
  *G06T 15/08* (2011.01)
  *G06T 7/593* (2017.01)

(52) U.S. Cl.
  CPC ..... *H04N 13/0022* (2013.01); *H04N 13/0048* (2013.01); *H04N 13/0242* (2013.01); *H04N 13/0271* (2013.01); *G06T 2207/10052* (2013.01); *H04N 2013/0081* (2013.01)

(58) Field of Classification Search
  CPC ......... G06T 9/00; G06T 9/20; H04N 13/0048; H04N 19/95; H04N 19/136; H04N 13/0022
  See application file for complete search history.

(56) References Cited

U.S. PATENT DOCUMENTS

| | | | |
|---|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,899,060 A | 2/1990 | Lischke |
| 5,005,083 A | 4/1991 | Grage |
| 5,070,414 A | 12/1991 | Tsutsumi |
| 5,144,448 A | 9/1992 | Hornbaker |
| 5,157,499 A | 10/1992 | Oguma et al. |
| 5,325,449 A | 6/1994 | Burt |
| 5,327,125 A | 7/1994 | Iwase et al. |
| 5,488,674 A | 1/1996 | Burt |
| 5,629,524 A | 5/1997 | Stettner et al. |
| 5,744,031 A | 4/1998 | Bene |
| 5,793,900 A | 8/1998 | Nourbakhsh et al. |
| 5,801,919 A | 9/1998 | Griencewic et al. |
| 5,808,350 A | 9/1998 | Jack et al. |
| 5,832,312 A | 11/1998 | Rieger et al. |
| 5,833,507 A | 11/1998 | Woodgate et al. |
| 5,880,691 A | 3/1999 | Fossum et al. |
| 5,911,008 A | 6/1999 | Hamada et al. |
| 5,933,190 A | 8/1999 | Dierickx et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu et al. |
| 6,175,379 B1 | 1/2001 | Uomori et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,443,579 B1 | 9/2002 | Myers et al. |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen et al. |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,927,922 B2 | 8/2005 | George et al. |
| 6,958,862 B1 | 10/2005 | Joseph |
| 7,015,954 B1 | 3/2006 | Foote et al. |
| 7,085,409 B2 | 8/2006 | Sawhney |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,235,785 B2 | 6/2007 | Hornback et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen |
| 7,430,312 B2 | 9/2008 | Gu |
| 7,496,293 B2 | 2/2009 | Shamir et al. |
| 7,564,019 B2 | 7/2009 | Olsen |
| 7,599,547 B2 | 10/2009 | Sun et al. |
| 7,606,484 B1 | 10/2009 | Richards et al. |
| 7,620,265 B1 | 11/2009 | Wolff |
| 7,633,511 B2 | 12/2009 | Shum et al. |
| 7,639,435 B2 | 12/2009 | Chiang et al. |
| 7,646,549 B2 | 1/2010 | Zalevsky et al. |
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |

(56) References Cited

U.S. PATENT DOCUMENTS

| | | |
|---|---|---|
| 8,089,515 B2 | 1/2012 | Chebil et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev |
| 8,194,296 B2 | 6/2012 | Compton |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Tubic et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Lin et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev |
| 8,406,562 B2 | 3/2013 | Bassi et al. |
| 8,411,146 B2 | 4/2013 | Twede |
| 8,446,492 B2 | 5/2013 | Nakano et al. |
| 8,456,517 B2 | 6/2013 | Mor et al. |
| 8,493,496 B2 | 7/2013 | Freedman et al. |
| 8,514,291 B2 | 8/2013 | Chang et al. |
| 8,514,491 B2 | 8/2013 | Duparre |
| 8,541,730 B2 | 9/2013 | Inuiya |
| 8,542,933 B2 * | 9/2013 | Venkataraman .......... G06T 9/00 382/233 |
| 8,553,093 B2 | 10/2013 | Wong et al. |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 * | 9/2014 | Venkataraman .......... G06T 9/00 382/233 |
| 8,836,793 B1 | 9/2014 | Kriesel et al. |
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Kobayashi et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman |
| 9,025,895 B2 | 5/2015 | Venkataraman |
| 9,030,528 B2 | 5/2015 | Pesach et al. |
| 9,031,335 B2 | 5/2015 | Venkataraman |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 * | 5/2015 | Venkataraman .......... G06T 9/00 382/233 |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 * | 5/2015 | Venkataraman .......... G06T 9/00 382/233 |
| 9,047,684 B2 | 6/2015 | Lelescu et al. |
| 9,049,367 B2 | 6/2015 | Venkataraman et al. |
| 9,055,233 B2 | 6/2015 | Venkataraman et al. |
| 9,060,120 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,100,586 B2 | 8/2015 | McMahon et al. |
| 9,100,635 B2 | 8/2015 | McMahon et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Ciurea et al. |
| 9,185,276 B2 | 11/2015 | Roda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,253,380 B2 | 2/2016 | Venkataraman et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 * | 1/2017 | Venkataraman .......... G06T 9/00 |
| 9,576,369 B2 | 2/2017 | Venkataraman et al. |
| 9,578,237 B2 | 2/2017 | Duparre et al. |
| 9,578,259 B2 | 2/2017 | Gabriel |
| 9,602,805 B2 | 3/2017 | Venkataraman et al. |
| 9,633,442 B2 | 4/2017 | Venkataraman et al. |
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |

(56) References Cited

U.S. PATENT DOCUMENTS

| | | |
|---|---|---|
| 9,712,759 B2 | 7/2017 | Venkataraman et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,858,673 B2 | 1/2018 | Ciurea et al. |
| 9,864,921 B2 | 1/2018 | Venkataraman et al. |
| 9,888,194 B2 | 2/2018 | Duparre |
| 9,898,856 B2 | 2/2018 | Yang et al. |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0012056 A1 | 1/2002 | Trevino |
| 2002/0015536 A1 | 2/2002 | Warren |
| 2002/0027608 A1 | 3/2002 | Johnson |
| 2002/0028014 A1 | 3/2002 | Ono et al. |
| 2002/0039438 A1 | 4/2002 | Mori et al. |
| 2002/0057845 A1 | 5/2002 | Fossum |
| 2002/0061131 A1 | 5/2002 | Sawhney et al. |
| 2002/0063807 A1 | 5/2002 | Margulis |
| 2002/0075450 A1 | 6/2002 | Aratani |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0120634 A1 | 8/2002 | Min et al. |
| 2002/0122113 A1 | 9/2002 | Foote et al. |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng et al. |
| 2003/0211405 A1 | 11/2003 | Venkataraman |
| 2004/0003409 A1 | 1/2004 | Berstis et al. |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams |
| 2004/0100570 A1 | 5/2004 | Shizukuishi |
| 2004/0105021 A1 | 6/2004 | Hu et al. |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski |
| 2004/0196379 A1 | 10/2004 | Chen et al. |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219264 A1 | 10/2005 | Shum et al. |
| 2005/0219363 A1 | 10/2005 | Kohler |
| 2005/0224843 A1 | 10/2005 | Boemler |
| 2005/0225654 A1 | 10/2005 | Feldman et al. |
| 2005/0265633 A1 | 12/2005 | Piacentino |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother |
| 2006/0046204 A1 | 3/2006 | Ono et al. |
| 2006/0049930 A1 | 3/2006 | Zruya et al. |
| 2006/0054780 A1 | 3/2006 | Garrood et al. |
| 2006/0054782 A1 | 3/2006 | Olsen |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203100 A1 | 9/2006 | Ajito et al. |

(56) References Cited

U.S. PATENT DOCUMENTS

| | | |
|---|---|---|
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen |
| 2007/0008575 A1 | 1/2007 | Yu et al. |
| 2007/0009150 A1 | 1/2007 | Suwa |
| 2007/0024614 A1 | 2/2007 | Tam |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0140685 A1 | 6/2007 | Wu et al. |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat et al. |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1 | 9/2007 | Weibrecht et al. |
| 2007/0228256 A1 | 10/2007 | Mentzer |
| 2007/0236595 A1 | 10/2007 | Pan et al. |
| 2007/0242141 A1 | 10/2007 | Ciurea et al. |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0296832 A1 | 12/2007 | Ota et al. |
| 2007/0296835 A1 | 12/2007 | Olsen |
| 2007/0296847 A1 | 12/2007 | Chang et al. |
| 2007/0297696 A1 | 12/2007 | Hamza |
| 2008/0006859 A1 | 1/2008 | Mionetto et al. |
| 2008/0015487 A1 | 1/2008 | Szamosfalvi et al. |
| 2008/0019611 A1 | 1/2008 | Larkin |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi et al. |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger et al. |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger et al. |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan |
| 2009/0127430 A1 | 5/2009 | Hirasawa et al. |
| 2009/0128644 A1 | 5/2009 | Camp et al. |
| 2009/0128833 A1 | 5/2009 | Yahav |
| 2009/0129667 A1 | 5/2009 | Ho et al. |
| 2009/0140131 A1 | 6/2009 | Utagawa et al. |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167934 A1 | 7/2009 | Gupta |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan et al. |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0297056 A1 | 12/2009 | Lelescu et al. |
| 2009/0302205 A9 | 12/2009 | Olsen et al. |

(56) References Cited

U.S. PATENT DOCUMENTS

| | | |
|---|---|---|
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang et al. |
| 2010/0045809 A1 | 2/2010 | Packard |
| 2010/0053342 A1 | 3/2010 | Hwang |
| 2010/0053600 A1 | 3/2010 | Tanida |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam |
| 2010/0128145 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0171866 A1 | 7/2010 | Brady et al. |
| 2010/0177411 A1 | 7/2010 | Hegde et al. |
| 2010/0182406 A1 | 7/2010 | Benitez et al. |
| 2010/0194860 A1 | 8/2010 | Mentz et al. |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Panahpour Tehrani et al. |
| 2010/0259610 A1 | 10/2010 | Petersen et al. |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0281070 A1 | 11/2010 | Chan et al. |
| 2010/0289941 A1 | 11/2010 | Ito |
| 2010/0290483 A1 | 11/2010 | Park et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu et al. |
| 2010/0321640 A1 | 12/2010 | Yeh et al. |
| 2010/0329556 A1 | 12/2010 | Mitarai et al. |
| 2011/0001037 A1 | 1/2011 | Tewinkle |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0085028 A1 | 4/2011 | Samadani et al. |
| 2011/0090217 A1 | 4/2011 | Mashitani et al. |
| 2011/0108708 A1 | 5/2011 | Olsen et al. |
| 2011/0115886 A1 | 5/2011 | Nguyen |
| 2011/0121421 A1 | 5/2011 | Charbon |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0208105 A1 | 8/2011 | Brandl et al. |
| 2011/0211077 A1 | 9/2011 | Nayar et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra |
| 2011/0222757 A1 | 9/2011 | Yeatman, Jr. et al. |
| 2011/0228142 A1 | 9/2011 | Brueckner |
| 2011/0228144 A1 | 9/2011 | Tian et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung |
| 2011/0255745 A1 | 10/2011 | Hodder et al. |
| 2011/0261993 A1 | 10/2011 | Weiming et al. |
| 2011/0267264 A1 | 11/2011 | McCarthy et al. |
| 2011/0267348 A1 | 11/2011 | Lin |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim, II et al. |
| 2012/0012748 A1 | 1/2012 | Pain et al. |
| 2012/0014456 A1 | 1/2012 | Martinez Bauza et al. |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0039525 A1 | 2/2012 | Tian et al. |
| 2012/0044249 A1 | 2/2012 | Mashitani et al. |
| 2012/0044372 A1 | 2/2012 | Côté et al. |

(56) References Cited

U.S. PATENT DOCUMENTS

| | | |
|---|---|---|
| 2012/0051624 A1 | 3/2012 | Ando et al. |
| 2012/0056982 A1 | 3/2012 | Katz et al. |
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian |
| 2012/0069235 A1 | 3/2012 | Imai |
| 2012/0081519 A1 | 4/2012 | Goma |
| 2012/0086803 A1 | 4/2012 | Malzbender et al. |
| 2012/0105590 A1 | 5/2012 | Fukumoto et al. |
| 2012/0105691 A1 | 5/2012 | Waqas et al. |
| 2012/0113232 A1 | 5/2012 | Joblove et al. |
| 2012/0113318 A1 | 5/2012 | Galstian et al. |
| 2012/0113413 A1 | 5/2012 | Miahczylowicz-Wolski et al. |
| 2012/0127275 A1 | 5/2012 | Von Zitzewitz et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0163672 A1 | 6/2012 | McKinnon |
| 2012/0169433 A1 | 7/2012 | Mullins |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0273420 A1 | 11/2012 | Gerber et al. |
| 2012/0274626 A1 | 11/2012 | Hsieh et al. |
| 2012/0287291 A1 | 11/2012 | McMahon et al. |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307093 A1 | 12/2012 | Miyoshi |
| 2012/0307099 A1 | 12/2012 | Yahata et al. |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0016245 A1 | 1/2013 | Yuba |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120605 A1 | 5/2013 | Georgiev et al. |
| 2013/0121559 A1 | 5/2013 | Hu |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares |
| 2013/0147979 A1 | 6/2013 | McMahon et al. |
| 2013/0176394 A1 | 7/2013 | Tian et al. |
| 2013/0208138 A1 | 8/2013 | Li |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0223759 A1 | 8/2013 | Nishiyama et al. |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By et al. |
| 2013/0293760 A1 | 11/2013 | Nisenzon et al. |
| 2013/0335598 A1 | 12/2013 | Gustavsson |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng et al. |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0132810 A1 | 5/2014 | McMahon |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |

(56) References Cited

U.S. PATENT DOCUMENTS

| | | |
|---|---|---|
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124113 A1 | 5/2015 | Rodda et al. |
| 2015/0124151 A1 | 5/2015 | Rodda et al. |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0199793 A1 | 7/2015 | Lelescu et al. |
| 2015/0199841 A1 | 7/2015 | Venkataraman et al. |
| 2015/0243480 A1 | 8/2015 | Yamada et al. |
| 2015/0244927 A1 | 8/2015 | Laroia et al. |
| 2015/0248744 A1 | 9/2015 | Hayasaka et al. |
| 2015/0254868 A1 | 9/2015 | Srikanth et al. |
| 2015/0296137 A1 | 10/2015 | Duparre et al. |
| 2015/0312455 A1 | 10/2015 | Venkataraman et al. |
| 2015/0326852 A1 | 11/2015 | Duparre et al. |
| 2015/0332468 A1 | 11/2015 | Hayasaka et al. |
| 2015/0373261 A1 | 12/2015 | Rodda |
| 2016/0037097 A1 | 2/2016 | Duparre |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0195733 A1 | 7/2016 | Lelescu et al. |
| 2016/0198096 A1 | 7/2016 | Lelescu et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0316140 A1 | 10/2016 | Nayar et al. |
| 2017/0006233 A1 | 1/2017 | Venkataraman et al. |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0163862 A1 | 6/2017 | Molina |
| 2017/0187933 A1 | 6/2017 | Duparre |
| 2017/0257562 A1 | 9/2017 | Venkataraman et al. |
| 2017/0365104 A1 | 12/2017 | McMahon et al. |
| 2018/0007284 A1 | 1/2018 | Venkataraman et al. |
| 2018/0013945 A1 | 1/2018 | Ciurea et al. |
| 2018/0024330 A1 | 1/2018 | Laroia |
| 2018/0139382 A1 | 5/2018 | Venkataraman et al. |

FOREIGN PATENT DOCUMENTS

| | | |
|---|---|---|
| CN | 101010619 A | 8/2007 |
| CN | 101064780 A | 10/2007 |
| CN | 101102388 A | 1/2008 |
| CN | 101147392 A | 3/2008 |
| CN | 101427372 A | 5/2009 |
| CN | 101606086 A | 12/2009 |
| CN | 101883291 A | 11/2010 |
| CN | 102037717 A | 4/2011 |
| CN | 102375199 A | 3/2012 |
| CN | 104081414 A | 10/2014 |
| CN | 104508681 A | 4/2015 |
| CN | 104662589 A | 5/2015 |
| CN | 104685513 A | 6/2015 |
| CN | 104081414 B | 8/2017 |
| CN | 107230236 A | 10/2017 |
| EP | 0677821 A2 | 10/1995 |
| EP | 840502 A2 | 5/1998 |
| EP | 1201407 A2 | 5/2002 |
| EP | 1355274 A2 | 10/2003 |
| EP | 1734766 A2 | 12/2006 |
| EP | 1243945 B1 | 1/2009 |
| EP | 2026563 A1 | 2/2009 |
| EP | 2104334 A1 | 9/2009 |
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2652678 A1 | 10/2013 |
| EP | 2761534 A1 | 8/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 3066690 A1 | 9/2016 |
| EP | 3328048 A1 | 5/2018 |
| GB | 2482022 A | 1/2012 |
| IN | 2708/CHENP/2014 A1 | 8/2015 |
| JP | 59-025483 | 9/1984 |
| JP | 64-037177 | 7/1989 |
| JP | 02-285772 A | 11/1990 |
| JP | H0715457 A | 1/1995 |
| JP | 09181913 A | 7/1997 |
| JP | 11142609 A | 5/1999 |
| JP | 11223708 A | 8/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |

(56) References Cited

FOREIGN PATENT DOCUMENTS

| | | |
|---|---|---|
| JP | 2001337263 A2 | 12/2001 |
| JP | 2002195910 A | 7/2002 |
| JP | 2002205310 A | 7/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008258885 A | 10/2008 |
| JP | 2009132010 A | 6/2009 |
| JP | 2009300268 A | 12/2009 |
| JP | 2011017764 A | 1/2011 |
| JP | 2011030184 A | 2/2011 |
| JP | 2011109484 A | 6/2011 |
| JP | 2011523538 A | 8/2011 |
| JP | 2013526801 A | 6/2013 |
| JP | 2014521117 A | 8/2014 |
| JP | 2014535191 A | 12/2014 |
| JP | 2015522178 A | 8/2015 |
| JP | 2015534734 A | 12/2015 |
| JP | 6140709 | 5/2017 |
| JP | 2017163550 A | 9/2017 |
| JP | 2017163587 | 9/2017 |
| KR | 1020110097647 A | 8/2011 |
| TW | 200828994 A | 7/2008 |
| TW | 200939739 A | 9/2009 |
| WO | 2005057922 A1 | 6/2005 |
| WO | 2006039906 A2 | 4/2006 |
| WO | 2006039906 A3 | 9/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2011008443 A2 | 1/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014004134 A1 | 1/2014 |
| WO | 2014005123 A1 | 1/2014 |
| WO | 2014031795 A1 | 2/2014 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014153098 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015070105 A1 | 5/2015 |
| WO | 2015074078 A1 | 5/2015 |
| WO | 2015081279 A1 | 6/2015 |
| WO | 2015134996 A1 | 9/2015 |

OTHER PUBLICATIONS

US 8,964,053, 02/2015, Venkataraman et al. (withdrawn)
US 8,965,058, 02/2015, Venkataraman et al. (withdrawn)
US 9,014,491, 04/2015, Venkataraman et al. (withdrawn)
US 9,338,332, 06/2016, Venkataraman et al. (withdrawn)
Extended European Search Report for EP Application No. 13810429.4, Completed Jan. 7, 2016, dated Jan. 15, 2016, 6 Pgs.
Extended European Search Report for European Application EP12782935.6, completed Aug. 28, 2014, dated Sep. 4, 2014, 7 Pgs.
Extended European Search Report for European Application EP12804266.0, Report Completed Jan. 27, 2015, dated Feb. 3, 2015, 6 Pgs.
Extended European Search Report for European Application EP12835041.0, Report Completed Jan. 28, 2015, dated Feb. 4, 2015, 7 Pgs.
Extended European Search Report for European Application EP13810229.8, Report Completed Apr. 14, 2016, dated Apr. 21, 2016, 7 pgs.
Extended European Search Report for European Application No. 13830945.5, Search completed Jun. 28, 2016, dated Jul. 7, 2016, 14 Pgs.
Extended European Search Report for European Application No. 13841613.6, Search completed Jul. 18, 2016, dated Jul. 26, 2016, 8 Pgs.
Extended European Search Report for European Application No. 14860103.2, Search completed Feb. 23, 2017, dated Mar. 3, 2017, 7 Pgs.
Supplementary European Search Report for EP Application No. 13831768.0, Search completed May 18, 2016, dated May 30, 2016, 13 Pgs.
International Preliminary Report on Patentability for International Application No. PCT/US2012/059813, Search Completed Apr. 15, 2014, 7 pgs.
International Preliminary Report on Patentability for International Application No. PCT/US2013/059991, dated Mar. 17, 2015, Mailed Mar. 26, 2015, 8 pgs.
International Preliminary Report on Patentability for International Application PCT/US13/56065, dated Feb. 24, 2015, Mailed Mar. 5, 2015, 4 Pgs.
International Preliminary Report on Patentability for International Application PCT/US13/62720, Report dated Mar. 31, 2015, Mailed Apr. 9, 2015, 8 Pgs.

(56) References Cited

OTHER PUBLICATIONS

International Preliminary Report on Patentability for International Application PCT/US2013/024987, dated Aug. 12, 2014, 13 Pgs.
International Preliminary Report on Patentability for International Application PCT/US2013/027146, completed Aug. 26, 2014, dated Sep. 4, 2014, 10 Pgs.
International Preliminary Report on Patentability for International Application PCT/US2013/039155, completed Nov. 4, 2014, dated Nov. 13, 2014, 10 Pgs.
International Preliminary Report on Patentability for International Application PCT/US2013/046002, dated Dec. 31, 2014, Mailed Jan. 8, 2015, 6 Pgs.
International Preliminary Report on Patentability for International Application PCT/US2013/048772, dated Dec. 31, 2014, Mailed Jan. 8, 2015, 8 Pgs.
International Preliminary Report on Patentability for International Application PCT/US2013/056502, dated Feb. 24, 2015, Mailed Mar. 5, 2015, 7 Pgs.
International Preliminary Report on Patentability for International Application PCT/US2013/069932, dated May 19, 2015, Mailed May 28, 2015, 12 Pgs.
International Preliminary Report on Patentability for International Application PCT/US2014/017766, dated Aug. 25, 2015, Mailed Sep. 3, 2015, 8 Pgs.
International Preliminary Report on Patentability for International Application PCT/US2014/018084, dated Aug. 25, 2015, Mailed Sep. 3, 2015, 11 Pgs.
International Preliminary Report on Patentability for International Application PCT/US2014/018116, dated Sep. 15, 2015, Mailed Sep. 24, 2015, 12 Pgs.
International Preliminary Report on Patentability for International Application PCT/US2014/021439, dated Sep. 15, 2015, Mailed Sep. 24, 2015, 9 Pgs.
International Preliminary Report on Patentability for International Application PCT/US2014/022118, dated Sep. 8, 2015, Mailed Sep. 17, 2015, 4 pgs.
International Preliminary Report on Patentability for International Application PCT/US2014/022123, dated Sep. 8, 2015, Mailed Sep. 17, 2015, 4 Pgs.
International Preliminary Report on Patentability for International Application PCT/US2014/022774, dated Sep. 22, 2015, Mailed Oct. 1, 2015, 5 Pgs.
International Preliminary Report on Patentability for International Application PCT/US2014/023762, dated Mar. 2, 2015, Mailed Mar. 9, 2015, 10 Pgs.
International Preliminary Report on Patentability for International Application PCT/US2014/024407, dated Sep. 15, 2015, Mailed Sep. 24, 2015, 8 Pgs.
International Preliminary Report on Patentability for International Application PCT/US2014/024903, dated Sep. 15, 2015, Mailed Sep. 24, 2015, 12 Pgs.
International Preliminary Report on Patentability for International Application PCT/US2014/024947, dated Sep. 15, 2015, Mailed Sep. 24, 2015, 7 Pgs.
International Preliminary Report on Patentability for International Application PCT/US2014/025100, dated Sep. 15, 2015, Mailed Sep. 24, 2015, 4 Pgs.
International Preliminary Report on Patentability for International Application PCT/US2014/025904, dated Sep. 15, 2015, Mailed Sep. 24, 2015, 5 Pgs.
International Preliminary Report on Patentability for International Application PCT/US2014/028447, dated Sep. 15, 2015, Mailed Sep. 24, 2015, 7 Pgs.
International Preliminary Report on Patentability for International Application PCT/US2014/030692, dated Sep. 15, 2015, Mailed Sep. 24, 2015, 6 Pgs.
International Preliminary Report on Patentability for International Application PCT/US2014/064693, dated May 10, 2016, Mailed May 19, 2016, 14 Pgs.
International Preliminary Report on Patentability for International Application PCT/US2014/066229, dated May 24, 2016, Mailed Jun. 6, 2016, 9 Pgs.
International Preliminary Report on Patentability for International Application PCT/US2014/067740, dated May 31, 2016, Mailed Jun. 9, 2016, 9 Pgs.
International Preliminary Report on Patentability for International Application PCT/US2015/019529, dated Sep. 13, 2016, Mailed Sep. 22, 2016, 9 Pgs.
International Search Report and Written Opinion for International Application No. PCT/US13/46002, completed Nov. 13, 2013, dated Nov. 29, 2013, 7 pgs.
International Search Report and Written Opinion for International Application No. PCT/US13/56065, Completed Nov. 25, 2013, dated Nov. 26, 2013, 8 pgs.
International Search Report and Written Opinion for International Application No. PCT/US13/59991, Completed Feb. 6, 2014, dated Feb. 26, 2014, 8 pgs.
International Search Report and Written Opinion for International Application No. PCT/US2011/064921, Completed Feb. 25, 2011, dated Mar. 6, 2012, 17 pgs.
International Search Report and Written Opinion for International Application No. PCT/US2013/024987, Completed Mar. 27, 2013, dated Apr. 15, 2013, 14 pgs.
International Search Report and Written Opinion for International Application No. PCT/US2013/027146, completed Apr. 2, 2013, 11 pgs.
International Search Report and Written Opinion for International Application No. PCT/US2013/039155, completed Jul. 1, 2013, dated Jul. 11, 2013, 11 Pgs.
International Search Report and Written Opinion for International Application No. PCT/US2013/048772, Completed Oct. 21, 2013, dated Nov. 8, 2013, 6 pgs.
International Search Report and Written Opinion for International Application No. PCT/US2013/056502, Completed Feb. 18, 2014, dated Mar. 19, 2014, 7 pgs.
International Search Report and Written Opinion for International Application No. PCT/US2013/069932, Completed Mar. 14, 2014, dated Apr. 14, 2014, 12 pgs.
International Search Report and Written Opinion for International Application No. PCT/US2015/019529, completed May 5, 2015, dated Jun. 8, 2015, 11 Pgs.
International Search Report and Written Opinion for International Application PCT/US11/36349, dated Aug. 22, 2011, 11 pgs.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, 2005, pp. 59622A-1-59622A-12.

(56) References Cited

OTHER PUBLICATIONS

Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Apposition Compound Eyes", 10th Microoptics Conference, Sep. 1-3, 2004, 2 pgs.
Eng, Wei Yong et al., "Gaze correction for 3D tele-immersive communication system", IVMSP Workshop, 2013 IEEE 11th. IEEE, Jun. 10, 2013.
Fanaswala, "Regularized Super-Resolution of Multi-View Images", Retrieved on Nov. 10, 2012 (Nov. 10, 2012). Retrieved from the Internet at URL:<http://www.site.uottawa.ca/-edubois/theses/Fanaswala_thesis.pdf>, 2009, 163 pgs.
Fang et al., "Volume Morphing Methods for Landmark Based 3D Image Deformation", SPIE vol. 2710, Proc. 1996 SPIE Intl Symposium on Medical Imaging, Newport Beach, CA, Feb. 1996, pp. 404-415.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 191-198.
Fischer et al., "Optical System Design", 2nd Edition, SPIE Press, Feb. 14, 2008, pp. 49-58.
Goldman et al., "Video Object Annotation, Navigation, and Composition", In Proceedings of UIST 2008, pp. 3-12.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Hasinoff et al., "Search-and-Replace Editing for Personal Photo Collections", Computational Photography (ICCP) 2010, pp. 1-8.
Hernandez-Lopez et al., "Detecting objects using color and depth segmentation with Kinect sensor", Procedia Technology, vol. 3, Jan. 1, 2012 (Jan. 1, 2012 ), pp. 196-204, XP055307680, ISSN: 2212-0173, DOI: 10.1016/j.protcy.2012.03.021.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Horn et al., "LightShop: Interactive Light Field Manipulation and Rendering", In Proceedings of I3D 2007, pp. 121-128.
Isaksen et al., "Dynamically Reparameterized Light Fields", In Proceedings of SIGGRAPH 2000, pp. 297-306.
Jarabo et al., "Efficient Propagation of Light Field Edits", In Proceedings of SIACG 2011, pp. 75-80.
Joshi et al., "Synthetic Aperture Tracking: Tracking Through Occlusions", I CCV IEEE 11th International Conference on Computer Vision; Publication [online]. Oct. 2007 [retrieved Jul. 28, 2014]. Retrieved from the Internet: <URL: http:I/ieeexplore.ieee.org/stamp/stamp.jsp?tp=&arnumber=4409032&isnumber=4408819>; pp. 1-8.
Kang et al., "Handling Occlusions inn Dense Multi-View Stereo", Computer Vision and Pattern Recognition, 2001, vol. 1, pp. I-103-I-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., CVPR 94, 8 pgs.
Lai et al., "A Large-Scale Hierarchical Multi-View RGB-D Object Dataset", Proceedings—IEEE International Conference on Robotics and Automation, May 2011, 8 pgs., DOI:10.1109/ICRA.201135980382.
Lee et al., "Electroactive Polymer Actuator for Lens-Drive Unit in Auto-Focus Compact Camera Module", ETRI Journal, vol. 31, No. 6, Dec. 2009, pp. 695-702.
Lensvector, "How LensVector Autofocus Works", printed Nov. 2, 2012 from http://www.lensvector.com/overview.html, 1 pg.
Levin et al., "A Closed Form Solution to Natural Image Matting", Pattern Analysis and Machine Intelligence, Feb. 2008, vol. 30, 8 pgs.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, 2008, pp. 3699-3707.
Merkle et al., "Adaptation and optimization of coding algorithms for mobile 3DTV", Mobile3DTV Project No. 216503, Nov. 2008, 55 pgs.
International Search Report and Written Opinion for International Application PCT/US13/62720, completed Mar. 25, 2014, dated Apr. 21, 2014, 9 Pgs.
International Search Report and Written Opinion for International Application PCT/US14/17766, completed May 28, 2014, dated Jun. 18, 2014, 9 Pgs.

(56) References Cited

OTHER PUBLICATIONS

International Search Report and Written Opinion for International Application PCT/US14/18084, completed May 23, 2014, dated Jun. 10, 2014, 12 Pgs.
International Search Report and Written Opinion for International Application PCT/US14/18116, completed May 13, 2014, dated Jun. 2, 2014, 12 Pgs.
International Search Report and Written Opinion for International Application PCT/US14/21439, completed Jun. 5, 2014, dated Jun. 20, 2014, 10 Pgs.
International Search Report and Written Opinion for International Application PCT/US14/22118, completed Jun. 9, 2014, dated Jun. 25, 2014, 5 pgs.
International Search Report and Written Opinion for International Application PCT/US14/22774 report completed Jun. 9, 2014, dated Jul. 14, 2014, 6 Pgs.
International Search Report and Written Opinion for International Application PCT/US14/24407, report completed Jun. 11, 2014, dated Jul. 8, 2014, 9 Pgs.
International Search Report and Written Opinion for International Application PCT/US14/25100, report completed Jul. 7, 2014, dated Aug 7, 2014, 5 Pgs.
International Search Report and Written Opinion for International Application PCT/US14/25904 report completed Jun. 10, 2014, dated Jul. 10, 2014, 6 Pgs.
International Search Report and Written Opinion for International Application PCT/US2009/044687, completed Jan. 5, 2010, dated Jan. 13, 2010, 9 pgs.
International Search Report and Written Opinion for International Application PCT/US2010/057661, completed Mar. 9, 2011, 14 pgs.
International Search Report and Written Opinion for International Application PCT/US2012/037670, dated Jul. 18, 2012, Completed Jul. 5, 2012, 9 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/058093, Report completed Nov. 15, 2012, 12 pgs.
International Search Report and Written Opinion for International Application PCT/US2012/059813, completed Dec. 17, 2012, 8 pgs.
International Search Report and Written Opinion for International Application PCT/US2014/022123, completed Jun. 9, 2014, dated Jun. 25, 2014, 5 pgs.
International Search Report and Written Opinion for International Application PCT/US2014/023762, Completed May 30, 2014, dated Jul. 3, 2014, 6 Pgs.
International Search Report and Written Opinion for International Application PCT/US2014/024903, completed Jun. 12, 2014, dated Jun. 27, 2014, 13 pgs.
International Search Report and Written Opinion for International Application PCT/US2014/024947, Completed Jul. 8, 2014, dated Aug. 5, 2014, 8 Pgs.
International Search Report and Written Opinion for International Application PCT/US2014/028447, completed Jun. 30, 2014, dated Jul. 21, 2014, 8 Pgs.
International Search Report and Written Opinion for International Application PCT/US2014/030692, completed Jul. 28, 2014, dated Aug. 27, 2014, 7 Pgs.
International Search Report and Written Opinion for International Application PCT/US2014/064693, Completed Mar. 7, 2015, dated Apr. 2, 2015, 15 pgs.
International Search Report and Written Opinion for International Application PCT/US2014/066229, Completed Mar. 6, 2015, dated Mar. 19, 2015, 9 Pgs.
International Search Report and Written Opinion for International Application PCT/US2014/067740, Completed Jan. 29, 2015, dated Mar. 3, 2015, 10 pgs.
Office Action for U.S. Appl. No. 12/952,106, dated Aug. 16, 2012, 12 pgs.
"File Formats Version 6", Alias Systems, 2004, 40 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bennett et al., "Multispectral Bilateral Video Fusion", 2007 IEEE Transactions on Image Processing, vol. 16, No. 5, May 2007, pp. 1185-1194.
Bennett et al., "Multispectral Video Fusion", Computer Graphics (ACM SIGGRAPH Proceedings), Jul. 25, 2006, 1 pg.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200.
Bishop et al., "Light Field Superresolution", Computational Photography (ICCP), 2009 IEEE International Conference, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, Aug. 2006, vol. 15, Issue 8, pp. 2239-2248.
Boye et al., "Comparison of Subpixel Image Registration Algorithms", Proc. of SPIE—IS&T Electronic Imaging, Feb. 2009, vol. 7246, pp. 72460X-1-72460X-9; doi: 10.1117/12.810369.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", Retrieved on Nov. 10, 2012, Retrieved from the Internet at URL:<http://citeseerx.ist.psu.edu/viewdoc/download?doi=10.1.1.226.2643&rep=rep1&type=pdf>, 2001, 269 pgs.
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.

(56) References Cited

OTHER PUBLICATIONS

Chan et al., "Super-resolution reconstruction in a computational compound-eye imaging system", Multidim Syst Sign Process, 2007, vol. 18, pp. 83-101.
Chen et al., "Interactive deformation of light fields", In Proceedings of SIGGRAPH I3D 2005, pp. 139-146.
Chen et al., "KNN Matting", IEEE Transactions on Pattern Analysis and Machine Intelligence, Sep. 2013, vol. 35, No. 9, pp. 2175-2188.
Crabb et al., "Real-time foreground segmentation via range and color imaging", Computer Vision and Pattern Recognition Workshops, 2008. CVPRW'08. IEEE Computer Society Conference on. IEEE, 2008.
Debevec et al., "Recovering High Dynamic Range Radiance Maps from Photographs", Computer Graphics (ACM SIGGRAPH Proceedings), Aug. 16, 1997, 10 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM SIGGRAPH, 2007, vol. 26, pp. 1-10, retrieved on Jul. 8, 2015 from the Internet <URL:http://doi.acm.org/1.1145/1276377.1276461>.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Light Field Photography with a Hand-held Plenoptic Camera", Stanford Tech Report CTSR Feb. 2005, Feb. 2005, pp. 1-11.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Multi-spectral Imaging Using Multiplexed Illumination", International Conference on Computer Vision, Oct. 25, 2007, pp. 1-8.
Park et al., "Super-Resolution Image Reconstruction", IEEE Signal Processing Magazine, May 2003, pp. 21-36.
Parkkinen et al., "Characteristic Spectra of Munsell Colors", J Opt. Soc. Am., vol. 6, No. 2, 1989, pp. 318-322.
Perwass et al., "Single Lens 3D-Camera with Extended Depth-of-Field", printed from www.raytrix.de, Jan. 2012, 15 pgs.
Pham et al., "Robust Super-Resolution without Regularization", Journal of Physics: Conference Series 124, 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs., Feb. 15, 2008.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasquea et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 2003, pp. 1-16.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Sauer et al., "Parallel Computation of Sequential Pixel Updates in Statistical Tomographic Reconstruction", ICIP 1995, pp. 93-96.
Seitz et al., "Plenoptic Image Editing", International Journal of Computer Vision 48, Jan. 1998, pp. 29 pgs., DOI: 10.1109/ICCV.1998.710696, Source: DBLP Conference: Computer Vision, Sixth International Conference.
Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5, 2014.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer vol. 77, No. 9, Sep. 1996, 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Maryland, College Park—Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, Nov. 1, 2013 (Nov. 1, 2013), pp. 1-13.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008.

(56) References Cited

OTHER PUBLICATIONS

Wang, "Calculation Image Position, Size and Orientation Using First Order Properties", Dec. 29, 2010, OPTI521 Tutorial, 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", retrieved fromhttp://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Wu et al., "A virtual view synthesis algorithm based on image inpainting", 2012 Third International Conference on Networking and Distributed Computing. IEEE, 2012.
Yang et al., "A Real-Time Distributed Light Field Camera", Eurographics Workshop on Rendering (2002), pp. 1-10.
Yang et al., "Superresolution Using Preconditioned Conjugate Gradient Method", Proceedings of SPIE—The International Society for Optical Engineering, Jul. 2002, 8 pgs.
Zhang et al., "A Self-Reconfigurable Camera Array", Eurographics Symposium on Rendering, 2004, 12 pgs.
Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zheng et al., "Balloon Motion Estimation Using Two Frames", Proceedings of the Asilomar Conference on Signals, Systems and Computers, IEEE, Comp. Soc. Press, US, vol. 2 of 02, Nov. 4, 1991, pp. 1057-1061.
Zomet et al., "Robust Super-Resolution", IEEE, 2001, pp. 1-6.
Extended European Search Report for European Application No. 14865463.5, Search completed May 30, 2017, dated Jun. 8, 2017, 6 Pgs.
International Preliminary Report on Patentability for International Application No. PCT/US2011/064921, Report dated Jun. 18, 2013, Mailed Jun. 27, 2013, 14 Pgs.
International Preliminary Report on Patentability for International Application PCT/US2014/029052, dated Sep. 15, 2015, Mailed Sep. 24, 2015, 9 Pgs.
International Search Report and Written Opinion for International Application PCT/US2014/029052, completed Jun. 30, 2014, dated Jul. 24, 2014, 10 Pgs.
Robert et al., "Dense Depth Map Reconstruction: A Minimization and Regularization Approach which Preserves Discontinuities", European Conference on Computer Vision (ECCV), pp. 439-451, (1996).
Van Der Wal et al., "The Acadia Vision Processor", Proceedings Fifth IEEE International Workshop on Computer Architectures for Machine Perception, Sep. 13, 2000, Padova, Italy, pp. 31-40.
Extended European Search Report for EP Application No. 11781313.9, Completed Oct. 1, 2013, dated Oct. 8, 2013, 6 pages.
Extended European Search Report for European Application EP13751714.0, completed Aug. 5, 2015, dated Aug. 18, 2015, 8 Pgs.
Extended European Search Report for European Application No. 14763087.5, Search completed Dec. 7, 2016, dated Dec. 19, 2016, 9 Pgs.
International Preliminary Report on Patentability for International Application No. PCT/US2012/056151, Report dated Mar. 25, 2014, 9 pgs.
International Preliminary Report on Patentability for International Application No. PCT/US2012/056166, Report dated Mar. 25, 2014, Report Mailed Apr. 3, 2014, 8 pgs.
International Preliminary Report on Patentability for International Application No. PCT/US2012/058093, Report dated Sep. 18, 2013, Mailed Oct. 22, 2013, 41 pgs.
International Preliminary Report on Patentability for International Application PCT/US10/057661, dated May 22, 2012, mailed May 31, 2012, 10 pages.
International Preliminary Report on Patentability for International Application PCT/US11/036349, Report dated Nov. 13, 2012, Mailed Nov. 22, 2012, 9 pages.
International Search Report and Written Opinion for International Application No. PCT/US2012/056166, Report Completed Nov. 10, 2012, dated Nov. 20, 2012, 9 pgs.
"Exchangeable image file format for digital still cameras: Exif Version 2.2", Japan Electronics and Information Technology Industries Association, Prepared by Technical Standardization Committee on AV & IT Storage Systems and Equipment, JEITA CP-3451, Apr. 2002, Retrieved from: http://www.exif.org/Exif2-2.PDF, 154 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
Aufderheide et al., "A MEMS-based Smart Sensor System for Estimation of Camera Pose for Computer Vision Applications", Research and Innovation Conference 2011, Jul. 29, 2011, pp. 1-10.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bryan et al., "Perspective Distortion from Interpersonal Distance Is an Implicit Visual Cue for Social Judgments of Faces", PLOS One, vol. 7, Issue 9, Sep. 26, 2012, e45301, doi:10.1371/journal.pone.0045301, 9 pages.
Carroll et al., "Image Warps for Artistic Perspective Manipulation", ACM Transactions on Graphics (TOG), vol. 29, No. 4, Jul. 26, 2010, Article No. 127, 9 pgs.
Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.
Chen et al., "KNN matting", 2012 IEEE Conference on Computer Vision and Pattern Recognition, Jun. 16-21, 2012, Providence, RI, USA, pages 869-876.
Cooper et al., "The perceptual basis of common photographic practice", Journal of Vision, vol. 12, No. 5, Article 8, May 25, 2012, pp. 1-14.
Do, Minh N., "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., "Immersive Visual Communication", IEEE Signal Processing Magazine, vol. 28, Issue 1, Jan. 2011, DOI: 10.1109/MSP.2010.939075, Retrieved from: http://minhdo.ece.illinois.edu/publications/ImmerComm_SPM.pdf, pp. 58-66.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Gastal et al., "Shared Sampling for Real-Time Alpha Matting", Computer Graphics Forum, EUROGRAPHICS 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.

(56) References Cited

OTHER PUBLICATIONS

Georgiev et al., "Light-Field Capture by Multiplexing in the Frequency Domain", Adobe Systems Incorporated, Adobe Technical Report, 2003, 13 pgs.
Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Holoeye Photonics AG, "LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pages.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pages.
Izadi et al., "KinectFusion: Real-time 3D Reconstruction and Interaction Using a Moving Depth Camera", UIST'11, Oct. 16-19, 2011, Santa Barbara, CA, pp. 559-568.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), vol. 1, Jun. 17-22, 2006, New York, NY, USA, pp. 371-378.
Kim et al., "Scene reconstruction from high spatio-angular resolution light fields", ACM Transactions on Graphics (TOG)—SIGGRAPH 2013 Conference Proceedings, vol. 32 Issue 4, Article 73, Jul. 21, 2013, 11 pages.
Konolige, Kurt, "Projected Texture Stereo", 2010 IEEE International Conference on Robotics and Automation, May 3-7, 2010, p. 148-155.
Kubota et al., "Reconstructing Dense Light Field From Array of Multifocus Images for Novel View Synthesis", IEEE Transactions on Image Processing, vol. 16, No. 1, Jan. 2007, pp. 269-279.
Lane et al., "A Survey of Mobile Phone Sensing", IEEE Communications Magazine, vol. 48, Issue 9, Sep. 2010, pp. 140-150.
Lee et al., "Automatic Upright Adjustment of Photographs", IEEE Conference on Computer Vision and Pattern Recognition (CVPR), 2012, pp. 877-884.
Lee et al., "Nonlocal matting", CVPR 2011, Jun. 20-25, 2011, pp. 2193-2200.
Levin et al., "Spectral Matting", 2007 IEEE Conference on Computer Vision and Pattern Recognition, Jun. 17-22, 2007, Minneapolis, MN, USA, pp. 1-8.
Li et al., "Fusing Images With Different Focuses Using Support Vector Machines", IEEE Transactions on Neural Networks, vol. 15, No. 6, Nov. 8, 2004, pp. 1555-1561.
Lim, Jongwoo, "Optimized Projection Pattern Supplementing Stereo Systems", 2009 IEEE International Conference on Robotics and Automation, May 12-17, 2009, pp. 2823-2829.
McGuire et al., "Defocus video matting", ACM Transactions on Graphics (TOG)—Proceedings of ACM SIGGRAPH 2005, vol. 24, Issue 3, Jul. 2005, pp. 567-576.
Nguyen et al., "Error Analysis for Image-Based Rendering with Depth Information", IEEE Transactions on Image Processing, vol. 18, Issue 4, Apr. 2009, pp. 703-716.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.
Nishihara, H.K., "PRISM: A Practical Real-Time Imaging Stereo Matcher", Massachusetts Institute of Technology, A.I. Memo 780, May 1984, 32 pgs.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Shotton et al., "Real-time human pose recognition in parts from single depth images", CVPR 2011, Jun. 20-25, 2011, Colorado Springs, CO, USA, pp. 1297-1304.
Shum et al., "A Review of Image-based Rendering Techniques", Visual Communications and Image Processing 2000, May 2000, 12 pgs.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pages.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Tseng et al., "Automatic 3-D depth recovery from a single urban-scene image", 2012 Visual Communications and Image Processing, Nov. 27-30, 2012, San Diego, CA, USA, pp. 1-6.
Vetro et al., "Coding Approaches for End-To-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Wang et al., "Automatic Natural Video Matting with Depth", 15th Pacific Conference on Computer Graphics and Applications, PG '07, Oct. 29-Nov. 2, 2007, Maui, HI, USA, pp. 469-472.
Wang et al., "Image and Video Matting: A Survey", Foundations and Trends, Computer Graphics and Vision, vol. 3, No. 2, 2007, pp. 91-175.
Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pages, published Aug. 5, 2007.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
U.S. Appl. No. 61/527,007.
Extended European Search Report for European Application No. 18151530.5, Completed Mar. 28, 2018, dated Apr. 20, 2018, 11 pages.

* cited by examiner

| Name | Byte number | Comments |
|---|---|---|
| Reserved for future extensions | Byte 3 | |
| Number of Auxiliary Maps | Byte 2 | Describes total number of Auxiliary maps present in the file |
| Depth Map Camera Array and Auxiliary Maps compression | Byte 1 | See detailed description in Figure 6 |
| Depth Map, Camera Array and Auxiliary Maps Selection | Byte 0 | See detailed description in Figure 7 |

| Data Type | Bit number | Selection values |
|---|---|---|
| Reserved for Future extensions | Bit 7 | |
| Confidence Map | Bit 7 | 0: Map is not included<br>1: Map is Present |
| Silhouette Edge Map | Bit 5 | 0: Map is not included<br>1: Map is Present |
| Regular Edge Map | Bit 4 | 0: Map is not included<br>1: Map is Present |
| Missing Pixel Map | Bit 3 | 0: Map is not included<br>1: Map is Present |
| Virtual View Point | Bit 2 | 0: No Virtual View Point<br>1: Virtual View Point is Present |
| Camera Array and Per camera Occlusion Data | Bit 1 | 0: Data is not included<br>1: Data are Present |
| Depth Map | Bit 0 | 0: Data is not included<br>1: Data is Present |

*FIG. 6*

| Reserved for Future extensions | Bit 7 | 0: Not Compressed<br>1: Compressed |
|---|---|---|
| Confidence Map | Bit 7 | 0: Not Compressed<br>1: Compressed |
| Silhouette Edge Map | Bit 5 | 0: Not Compressed<br>1: Compressed |
| Regular Edge Map | Bit 4 | 0: Not Compressed<br>1: Compressed |
| Missing Pixel Map | Bit 3 | 0: Not Compressed<br>1: Compressed |
| Virtual View Point | Bit 2 | 0: Not Present<br>1: Present |
| Camera Array and Per camera Occlusion Data | Bit 1 | 0: Not Compressed<br>1: Compressed |
| Depth Map | Bit 0 | 0: Regular JPEG compression<br>1: Lossless JPEG LS compression |

*FIG. 7*

| Attribute name | Attribute Tag ID (4Byte) | Attribute Description |
|---|---|---|
| Reserved for future extensions | 2-127 | |
| In Focus Plane | 1 | Define central in focus Depth Plane |
| F# | 0 | Defines Synthetic Aperture |

FIG. 8

| Name | Byte Number | Description | Comments |
|---|---|---|---|
| Reserved for future extensions | 9-15 | | |
| Version | 7-8 | The most significant byte is used for major revisions, the least significant byte for minor revisions. Version 1.00 is the current revision. | Initial version must support Regular JPEG 8-bit grayscale compression |
| Identifier | 0-6 | Zero terminated string "PIDZDH" uniquely identifies this descriptor | |

FIG. 9

| Name | Byte Numbers | Description | Comments |
|---|---|---|---|
| Compressed Depth Map Data | 16 to 16 + Length | Compressed Depth Map Data for Current Segment | |
| Reserved for future extensions | 13-15 | | |
| Offset to the next Marker | 9-12 | Number of bites from current Marker to the next Marker excluding the APP9 marker itself | Next Marker could be either Depth Map Data Segment Marker, Camera Array Marker or Auxiliary Map Marker |
| Length | 7-8 | Total APP9 field byte count, including the byte count value (2 bytes), but excluding the APP9 marker itself. | A JPEG marker is limited to 65533 bytes. To represent the whole map multiple depth map markers with the same ID will be following each other |
| Identifier | 0-6 | Zero terminated string "PIDZDD" uniquely identifies this descriptor | |

*FIG. 10*

| Attribute name | Attribute Tag ID (4Byte) | Bytes | Attribute Description | Comments |
|---|---|---|---|---|
| Horizontal dimension | 0 | 4 | Number of cameras in horizontal direction N | We assume two dimensional Camera Array |
| Vertical dimension | 1 | 4 | Number of cameras in horizontal direction M | |
| Reference camera position | 2 | 4 | Camera number (row major) | |
| Virtual View Position | 3 | 8 | Two floating point numbers Px and Py defining Horizontal and Vertical position of Virtual View point | Constrains:<br><br>$0 <= Px <= N$<br><br>$0 <= Py <= M$ |
| Number of cameras with occlusion data | 4 | 4 | Number of cameras in camera array with occlusion data | |

*FIG. 11*

| Name | Byte Number | Description | Comments |
|---|---|---|---|
| Reserved for future extensions | 9-15 | | |
| Version | 7-8 | The most significant byte is used for major revisions, the least significant byte for minor revisions. Version 1.00 is the current revision. | Initial version must support Regular JPEG 8-bit grayscale compression |
| Identifier | 0-6 | Zero terminated string "PIDZAH" uniquely identifies this descriptor | |

*FIG. 12*

| Name | Byte Numbers | Description | Comments |
|---|---|---|---|
| Reserved for future extensions | 14-15 | | |
| Offset to the next Marker | 12-13 | Number of bites from current Marker to the next Marker excluding the APP9 marker itself | Next Marker could be either Depth Map Data Segment Marker, Camera Array Marker or Auxiliary Map Marker |
| Length | 10-11 | Total APP9 field byte count, including the byte count value (2 bytes), but excluding the APP9 marker itself. | A JPEG marker is limited to 65533 bytes. To represent the whole map multiple depth map markers with the same ID will be following each other |
| Number of Occluded pixels | 8-9 | Total Number of Occluded Pixels in this Camera | Currently Camera Array Data is not compressed |
| Camera Number | 7 | Camera Number (row major) | |
| Identifier | 0-6 | Zero terminated string "PIDZCD" uniquely identifies this descriptor | |

*FIG. 13*

| Name | Byte Numbers | Description | Comments |
|---|---|---|---|
| Individual Camera Data for Current Segment | 16 to 16 + Length | Occlusion Data | Occlusion Data in current revision is not compressed |
| Reserved for future extensions | 12-15 | | |
| Offset to the next Marker | 10-11 | Number of bites from current Marker to the next Marker excluding the APP9 marker itself | Next Marker could be either Depth Map Data Segment Marker, Camera Array Marker or Auxiliary Map Marker |
| Length | 8-9 | Total APP9 field byte count, including the byte count value (2 bytes), but excluding the APP9 marker itself. | A JPEG marker is limited to 65533 bytes. To represent the whole map multiple depth map markers with the same ID will be following each other |
| Number of Pixels | 7- 8 | Number of occluded pixels in current segment | |
| Identifier | 0-6 | Zero terminated string "PIDZCD" uniquely identifies this descriptor | |

*FIG. 14*

| Name | Number of Bytes | Attribute Description | Comments |
|---|---|---|---|
| Depth | 1 | Depth value | |
| RGB Color | 3 | Pixel color | |
| Pixel coordinates | 8 | Two integer numbers defining x an y Pixel coordinates | |

*FIG. 15*

| Name | Byte Number | Description | Comments |
|---|---|---|---|
| Reserved for future extensions | 11-15 | | |
| Number of bits per Map | 10 | Number of bits per pixel for current Auxiliary Map | |
| Auxiliary Map Type | 9 | Type of Auxiliary maps | The following types of Auxiliary Maps have been currently defined:<br>0 = Missing Pixel<br>1 = Regular Edge<br>2 = Silhouette Edge<br>3 = Confidence |
| Version | 7-8 | The most significant byte is used for major revisions, the least significant byte for minor revisions. Version 1.00 is the currentrevision. | Initial version must support Regular JPEG 8-bit grayscale compression |
| Identifier | 0-6 | Zero terminated string "PIDZAM" uniquely identifies this descriptor | |

*FIG. 16*

| Name | Byte Numbers | Description | Comments |
|---|---|---|---|
| Auxiliary Map Data | 16 to 16 + Length | Auxiliary data | Not compressed in current revision |
| Reserved for future extensions | 15 | | |
| Offset to the next Marker | 11-14 | Number of bites from current Marker to the next Marker excluding the APP9 marker itself | Next Marker could be either Depth Map Data Segment Marker, Camera Array Marker or Auxiliary Map Marker |
| Length | 9-10 | Total APP9 field byte count, including the byte count value (2 bytes), but excluding the APP9 marker itself. | A JPEG marker is limited to 65533 bytes. To represent the whole map multiple depth map markers with the same ID will be following each other |
| Number of pixels | 7-8 | Number of pixels in current segment | |
| Identifier | 0-6 | Zero terminated string "PIDZAD" uniquely identifies this descriptor | |

*FIG. 17*

SYSTEMS AND METHODS FOR DECODING IMAGE FILES CONTAINING DEPTH MAPS STORED AS METADATA

CROSS-REFERENCE TO RELATED APPLICATION

The present invention is a continuation of U.S. patent application Ser. No. 14/667,492, filed Mar. 24, 2015, which is a continuation of U.S. patent application Ser. No. 14/504,687, filed Oct. 2, 2014 and issued as U.S. Pat. No. 9,042,667 on May 26, 2015, which is a continuation of U.S. patent application Ser. No. 14/477,374, filed Sep. 4, 2014 and issued as U.S. Pat. No. 9,036,931 on May 19, 2015, which is a continuation of U.S. patent application Ser. No. 13/955,411, filed Jul. 31, 2013 and issued as U.S. Pat. No. 8,831,367 on Sep. 9, 2014, which is a continuation of U.S. patent application Ser. No. 13/631,736, filed Sep. 28, 2012 and issued as U.S. Pat. No. 8,542,933 on Sep. 24, 2013, which claims priority to U.S. Provisional Application No. 61/540,188 entitled "JPEG-DX: A Backwards-compatible, Dynamic Focus Extension to JPEG", to Venkataraman et al., filed Sep. 28, 2011, the disclosures of which are incorporated herein by reference in its entirety.

FIELD OF THE INVENTION

The present invention relates to decoding of image files and more specifically to the decoding of light field image files.

BACKGROUND

The ISO/IEC 10918-1 standard, more commonly referred to as the JPEG standard after the Joint Photographic Experts Group that developed the standard, establishes a standard process for digital compression and coding of still images. The JPEG standard specifies a codec for compressing an image into a bitstream and for decompressing the bitstream back into an image.

A variety of container file formats including the JPEG File Interchange Format (JFIF) specified in ISO/IEC 10918-5 and the Exchangeable Image File Format (Exif) and can be used to store a JPEG bitstream. JFIF can be considered a minimal file format that enables JPEG bitstreams to be exchanged between a wide variety of platforms and applications. The color space used in JFIF files is YCbCr as defined by CCIR Recommendation 601, involving 256 levels. The Y, Cb, and Cr components of the image file are converted from R, G, and B, but are normalized so as to occupy the full 256 levels of an 8-bit binary encoding. YCbCr is one of the compression formats used by JPEG. Another popular option is to perform compression directly on the R, G and B color planes. Direct RGB color plane compression is also popular when lossless compression is being applied.

A JPEG bitstream stores 16-bit word values in big-endian format. JPEG data in general is stored as a stream of blocks, and each block is identified by a marker value. The first two bytes of every JPEG bitstream are the Start Of Image (SOI) marker values FFh D8h. In a JFIF-compliant file there is a JFIF APP0 (Application) marker, immediately following the SOI, which consists of the marker code values FFh E0h and the characters JFIF in the marker data, as described in the next section. In addition to the JFIF marker segment, there may be one or more optional JFIF extension marker segments, followed by the actual image data.

Overall, the JFIF format supports sixteen "Application markers" to store metadata. Using application markers makes it is possible for a decoder to parse a JFIF file and decode only required segments of image data. Application markers are limited to 64K bytes each but it is possible to use the same maker ID multiple times and refer to different memory segments.

An APP0 marker after the SOI marker is used to identify a JFIF file. Additional APP0 marker segments can optionally be used to specify JFIF extensions. When a decoder does not support decoding a specific JFIF application marker, the decoder can skip the segment and continue decoding.

One of the most popular file formats used by digital cameras is Exif. When Exif is employed with JPEG bitstreams, an APP1 Application marker is used to store the Exif data. The Exif tag structure is borrowed from the Tagged Image File Format (TIFF) maintained by Adobe Systems Incorporated of San Jose, Calif.

SUMMARY OF THE INVENTION

Systems and methods in accordance with embodiments of the invention are configured to render images using light field image files containing an image synthesized from light field image data and metadata describing the image that includes a depth map. One embodiment of the invention includes a processor and memory containing a rendering application and a light field image file including an encoded image and metadata describing the encoded image, where the metadata comprises a depth map that specifies depths from the reference viewpoint for pixels in the encoded image. In addition, the rendering application configures the processor to: locate the encoded image within the light field image file; decode the encoded image; locate the metadata within the light field image file; and post process the decoded image by modifying the pixels based on the depths indicated within the depth map to create a rendered image.

In a further embodiment the rendering application configuring the processor to post process the decoded image by modifying the pixels based on the depths indicated within the depth map to create the rendered image comprises applying a depth based effect to the pixels of the decoded image.

In another embodiment, the depth based effect comprises at least one effect selected from the group consisting of: modifying the focal plane of the decoded image; modifying the depth of field of the decoded image; modifying the blur in out-of-focus regions of the decoded image; locally varying the depth of field of the decoded image; creating multiple focus areas at different depths within the decoded image; and applying a depth related blur.

In a still further embodiment, the encoded image is an image of a scene synthesized from a reference viewpoint using a plurality of lower resolution images that capture the scene from different viewpoints, the metadata in the light field image file further comprises pixels from the lower resolution images that are occluded in the reference viewpoint, and the rendering application configuring the processor to post process the decoded image by modifying the pixels based on the depths indicated within the depth map to create the rendered image comprises rendering an image from a different viewpoint using the depth map and the pixels from the lower resolution images that are occluded in the reference viewpoint.

In still another embodiment, the metadata in the light field image file includes descriptions of the pixels from the lower resolution images that are occluded in the reference viewpoint including the color, location, and depth of the occluded pixels, and rendering an image from a different viewpoint using the depth map and the pixels from the lower resolution images that are occluded in the reference viewpoint further includes: shifting pixels from the decoded image and the occluded pixels in the metadata to the different viewpoint based upon the depths of the pixels; determining pixel occlusions; and generating an image from the different viewpoint using the shifted pixels that are not occluded and by interpolating to fill in missing pixels using adjacent pixels that are not occluded.

In a yet further embodiment, the image rendered from the different viewpoint is part of a stereo pair of images.

In yet another embodiment, the metadata in the light field image file further comprises a confidence map for the depth map, where the confidence map indicates the reliability of the depth values provided for pixels by the depth map, and rendering an image from a different viewpoint using the depth map and the pixels from the lower resolution images that are occluded in the reference viewpoint further comprises applying at least one filter based upon the confidence map.

In a further embodiment again, the metadata in the light field image file further comprises an edge map that indicates pixels in the decoded image that lie on a discontinuity, and rendering an image from a different viewpoint using the depth map and the pixels from the lower resolution images that are occluded in the reference viewpoint further comprises applying at least one filter based upon the edge map.

In another embodiment again, the edge map identifies whether a pixel lies on an intensity discontinuity.

In a further additional embodiment, the edge map identifies whether a pixel lies on an intensity and depth discontinuity.

In another additional embodiment, the metadata in the light field image file further comprises a missing pixel map that indicates pixels in the decoded image that do not correspond to a pixel from the plurality of low resolution images of the scene and that are generated by interpolating pixel values from adjacent pixels in the synthesized image, and rendering an image from a different viewpoint using the depth map and the pixels from the lower resolution images that are occluded in the reference viewpoint further comprises ignoring pixels based upon the missing pixel map.

In a still further embodiment again, the light field image file conforms to the JFIF standard and the encoded image is encoded in accordance with the JPEG standard, the memory comprises a JPEG decoder application; and the rendering application configures the processor to: locate the encoded image by locating a Start of Image marker within the light field image file; and decode the encoded image using the JPEG decoder.

In still another embodiment again, the metadata is located within an Application marker segment within the light field image file.

In a still further additional embodiment, the Application marker segment is identified using the APP9 marker.

In still another additional embodiment, the depth map is encoded in accordance with the JPEG standard using lossless compression, and the rendering application configures the processor to: locate at least one Application marker segment containing the metadata comprising the depth map; and decode the depth map using the JPEG decoder.

In a yet further embodiment again, the encoded image is an image of a scene synthesized from a reference viewpoint using a plurality of lower resolution images that capture the scene from different viewpoints, the metadata in the light field image file further comprises pixels from the lower resolution images that are occluded in the reference viewpoint, the rendering application configures the processor to locate at least one Application marker segment containing the metadata comprising the pixels from the lower resolution images that are occluded in the reference viewpoint, and the rendering application configuring the processor to post process the decoded image by modifying the pixels based on the depth of the pixel indicated within the depth map to create the rendered image comprises rendering an image from a different viewpoint using the depth map and the pixels from the lower resolution images that are occluded in the reference viewpoint.

In yet another embodiment again, the metadata in the light field image file includes descriptions of the pixels from the lower resolution images that are occluded in the reference viewpoint including the color, location, and depth of the occluded pixels, and rendering an image from a different viewpoint using the depth map and the pixels from the lower resolution images that are occluded in the reference viewpoint further includes: shifting pixels from the decoded image and the occluded pixels in the metadata to the different viewpoint based upon the depths of the pixels; determining pixel occlusions; and generating an image from the different viewpoint using the shifted pixels that are not occluded and by interpolating to fill in missing pixels using adjacent pixels that are not occluded.

In a yet further additional embodiment, the image rendered from the different viewpoint is part of a stereo pair of images.

In yet another additional embodiment, the metadata in the light field image file further comprises a confidence map for the depth map, where the confidence map indicates the reliability of the depth values provided for pixels by the depth map, and rendering an image from a different viewpoint using the depth map and the pixels from the lower resolution images that are occluded in the reference viewpoint further comprises applying at least one filter based upon the confidence map.

In a further additional embodiment again, the metadata in the light field image file further comprises an edge map that indicates pixels in the decoded image that lie on a discontinuity, and rendering an image from a different viewpoint using the depth map and the pixels from the lower resolution images that are occluded in the reference viewpoint further comprises applying at least one filter based upon the edge map.

In another additional embodiment again, the edge map identifies whether a pixel lies on an intensity discontinuity.

In a still yet further embodiment again, the edge map identifies whether a pixel lies on an intensity and depth discontinuity.

In still yet another embodiment again, the edge map is encoded in accordance with the JPEG standard using lossless compression, and the rendering application configures the processor to: locate at least one Application marker segment containing the metadata comprising the edge map; and decode the edge map using the JPEG decoder.

In a still yet further additional embodiment, the metadata in the light field image file further comprises a missing pixel map that indicates pixels in the decoded image that do not correspond to a pixel from the plurality of low resolution images of the scene and that are generated by interpolating pixel values from adjacent pixels in the synthesized image, and rendering an image from a different viewpoint using the depth map and the pixels from the lower resolution images that are occluded in the reference viewpoint further comprises ignoring pixels based upon the missing pixel map.

In still yet another additional embodiment, the missing pixel map is encoded in accordance with the JPEG standard using lossless compression, and the rendering application configures the processor to: locate at least one Application marker segment containing the metadata comprising the missing pixel; and decode the missing pixel map using the JPEG decoder.

An embodiment of the method of the invention includes locating an encoded image within an light field image file using a rendering device, decoding the encoded image using the rendering device, locating the metadata within the light field image file using the rendering device, and post processing the decoded image by modifying the pixels based on the depths indicated within the depth map to create a rendered image using the rendering device.

In a further embodiment of the method of the invention, post processing the decoded image by modifying the pixels based on the depths indicated within the depth map to create the rendered image comprises applying a depth based effect to the pixels of the decoded image using the rending device.

In another embodiment of the method of the invention, the depth based effect comprises at least one effect selected from the group consisting of: modifying the focal plane of the decoded image using the rendering device; modifying the depth of field of the decoded image using the rendering device; modifying the blur in out-of-focus regions of the decoded image using the rendering device; locally varying the depth of field of the decoded image using the rendering device; creating multiple focus areas at different depths within the decoded image using the rendering device; and applying a depth related blur using the rendering device.

In a still further embodiment of the method of the invention, the encoded image is an image of a scene synthesized from a reference viewpoint using a plurality of lower resolution images that capture the scene from different viewpoints, the metadata in the light field image file further comprises pixels from the lower resolution images that are occluded in the reference viewpoint, and post processing the decoded image by modifying the pixels based on the depths indicated within the depth map to create the rendered image comprises using the depth map and the pixels from the lower resolution images that are occluded in the reference viewpoint to render an image from a different viewpoint using the rendering device.

Another further embodiment of the invention includes a machine readable medium containing processor instructions, where execution of the instructions by a processor causes the processor to perform a process involving: locating an encoded image within a light field image file, where the light field image file includes an encoded image and metadata describing the encoded image comprising a depth map that specifies depths from the reference viewpoint for pixels in the encoded image; decoding the encoded image; locating the metadata within the light field image file; and post processing the decoded image by modifying the pixels based on the depths indicated within the depth map to create a rendered image.

BRIEF DESCRIPTION OF THE DRAWINGS

FIG. 6 illustrates a "Depth Map, Camera Array and Auxiliary Maps Selection Descriptor" contained within an APP9 Application marker segment of a light field image file that conforms to the JFIF standard in accordance with an embodiment of the invention.

FIG. 7 illustrates a "Depth Map, Camera Array and Auxiliary Maps Compression Descriptor" contained within an APP9 Application marker segment of a light field image file that conforms to the JFIF standard in accordance with an embodiment of the invention.

FIG. 8 illustrates a "Depth Map Attributes" field within a "Depth Map Header" contained within an APP9 Application marker segment of a light field image file that conforms to the JFIF standard in accordance with an embodiment of the invention.

FIG. 9 illustrates a "Depth Map Descriptor" field within a "Depth Map Header" contained within an APP9 Application marker segment of a light field image file that conforms to the JFIF standard in accordance with an embodiment of the invention.

FIG. 10 illustrates a "Depth Map Data Descriptor" contained within an APP9 Application marker segment of a light field image file that conforms to the JFIF standard in accordance with an embodiment of the invention.

FIG. 11 illustrates a "Camera Array Attributes" field within a "Camera Array Header" contained within an APP9 Application marker segment of a light field image file that conforms to the JFIF standard in accordance with an embodiment of the invention.

FIG. 12 illustrates a "Camera Array Descriptor" field within a "Camera Array Header" contained within an APP9 Application marker segment of a light field image file that conforms to the JFIF standard in accordance with an embodiment of the invention.

FIG. 13 illustrates an "Individual Camera Descriptor" contained within an APP9 Application marker segment of a light field image file that conforms to the JFIF standard in accordance with an embodiment of the invention.

FIG. 14 illustrates "Individual Camera Data" within an APP9 Application marker segment of a light field image file that conforms to the JFIF standard in accordance with an embodiment of the invention.

FIG. 15 illustrates an "Individual Pixel Data Structure" within an APP9 Application marker segment of a light field image file that conforms to the JFIF standard in accordance with an embodiment of the invention.

FIG. 16 illustrates an "Auxiliary Map Descriptor" within an "Auxiliary Map Header" contained within an APP9 Application marker segment of a light field image file that conforms to the JFIF standard in accordance with an embodiment of the invention.

FIG. 17 illustrates an "Auxiliary Map Data Descriptor" within an APP9 Application marker segment of a light field image file that conforms to the JFIF standard in accordance with an embodiment of the invention.

DETAILED DESCRIPTION

Figure 1:
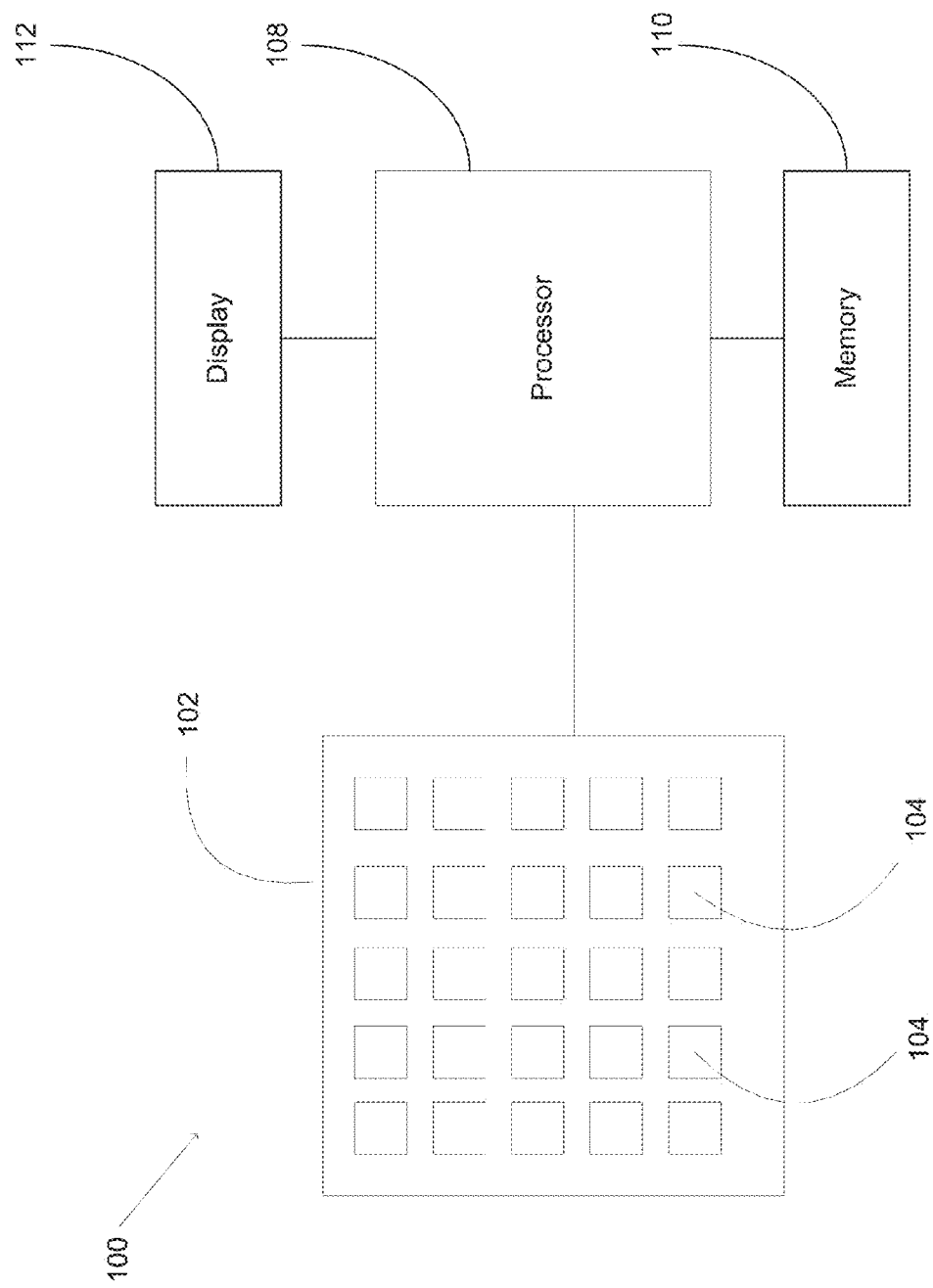
FIG. 1 conceptually illustrates the architecture of an array camera configured to generate light field image files in accordance with embodiments of the invention.

Turning now to the drawings, systems and methods for storing images synthesized from light field image data and metadata describing the images in electronic files and for rendering images using the stored image and the metadata in accordance with embodiments of the invention are illustrated. A file containing an image synthesized from light field image data and metadata derived from the light field image data can be referred to as a light field image file. As is discussed further below, the encoded image in a light field image file is typically synthesized using a super resolution process from a number of lower resolution images. The light field image file can also include metadata describing the synthesized image derived from the light field image data that enables post processing of the synthesized image. In many embodiments, a light field image file is created by encoding an image synthesized from light field image data and combining the encoded image with a depth map derived from the light field image data. In several embodiments, the encoded image is synthesized from a reference viewpoint and the metadata includes information concerning pixels in the light field image that are occluded from the reference viewpoint. In a number of embodiments, the metadata can also include additional information including (but not limited to) auxiliary maps such as confidence maps, edge maps, and missing pixel maps that can be utilized during post processing of the encoded image to improve the quality of an image rendered using the light field image data file.

In many embodiments, the light field image file is compatible with the JPEG File Interchange Format (JFIF). The synthesized image is encoded as a JPEG bitstream and stored within the file. The accompanying depth map, occluded pixels and/or any appropriate additional information including (but not limited to) auxiliary maps are then stored within the JFIF file as metadata using an Application marker to identify the metadata. A legacy rendering device can simply display the synthesized image by decoding the JPEG bitstream. Rendering devices in accordance with embodiments of the invention can perform additional post-processing on the decoded JPEG bitstream using the depth map and/or any available auxiliary maps. In many embodiments, the maps included in the metadata can also be compressed using lossless JPEG encoding and decoded using a JPEG decoder. Although much of the discussion that follows references the JFIF and JPEG standards, these standards are simply discussed as examples and it should be appreciated that similar techniques can be utilized to embed metadata derived from light field image data used to synthesize the encoded image within a variety of standard file formats, where the synthesized image and/or maps are encoded using any of a variety of standards based image encoding processes.

By transmitting a light field image file including an encoded image, and metadata describing the encoded image, a rendering device (i.e. a device configured to generate an image rendered using the information within the light field image file) can render new images using the information within the file without the need to perform super resolution processing on the original light field image data. In this way, the amount of data transmitted to the rendering device and the computational complexity of rendering an image is reduced. In several embodiments, rendering devices are configured to perform processes including (but not limited to) refocusing the encoded image based upon a focal plane specified by the user, synthesizing an image from a different viewpoint, and generating a stereo pair of images. The capturing of light field image data and the encoding and decoding of light field image files in accordance with embodiments of the invention are discussed further below.

Capturing Light Held Image Data

A light field, which is often defined as a 4D function characterizing the light from all direction at all points in a scene, can be interpreted as a two-dimensional (2D) collection of 2D images of a scene. Array cameras, such as those described in U.S. patent application Ser. No. 12/935,504 entitled "Capturing and Processing of Images using Monolithic Camera Array with Heterogeneous Imagers" to Venkataraman et al., can be utilized to capture light field images. In a number of embodiments, super resolution processes such as those described in U.S. patent application Ser. No. 12/967,807 entitled "Systems and Methods for Synthesizing High Resolution Images Using Super-Resolution Processes" to Lelescu et al., are utilized to synthesize a higher resolution 2D image or a stereo pair of higher resolution 2D images from the lower resolution images in the light field captured by an array camera. The terms high or higher resolution and low or lower resolution are used here in a relative sense and not to indicate the specific resolutions of the images captured by the array camera. The disclosures of U.S. patent application Ser. No. 12/935,504 and U.S. patent application Ser. No. 12/967,807 are hereby incorporated by reference in their entirety.

Each two-dimensional (2D) image in a captured light field is from the viewpoint of one of the cameras in the array camera. A high resolution image synthesized using super resolution processing is synthesized from a specific viewpoint that can be referred to as a reference viewpoint. The reference viewpoint can be from the viewpoint of one of the cameras in a camera array. Alternatively, the reference viewpoint can be an arbitrary virtual viewpoint.

Due to the different viewpoint of each of the cameras, parallax results in variations in the position of foreground objects within the images of the scene. Processes for performing parallax detection are discussed in U.S. Provisional Patent Application Ser. No. 61/691,666 entitled "Systems and Methods for Parallax Detection and Correction in Images Captured Using Array Cameras" to Venkataraman et al., the disclosure of which is incorporated by reference herein in its entirety. As is disclosed in U.S. Provisional Patent Application Ser. No. 61/691,666, a depth map from a reference viewpoint can be generated by determining the disparity between the pixels in the images within a light field due to parallax. A depth map indicates the distance of the surfaces of scene objects from a reference viewpoint. In a number of embodiments, the computational complexity of generating depth maps is reduced by generating an initial low resolution depth map and then increasing the resolution of the depth map in regions where additional depth information is desirable such as (but not limited to) regions involving depth transitions and/or regions containing pixels that are occluded in one or more images within the light field.

During super resolution processing, a depth map can be utilized in a variety of ways. U.S. patent application Ser. No. 12/967,807 describes how a depth map can be utilized during super resolution processing to dynamically refocus a synthesized image to blur the synthesized image to make portions of the scene that do not lie on the focal plane to appear out of focus. U.S. patent application Ser. No. 12/967,807 also describes how a depth map can be utilized during super resolution processing to generate a stereo pair of higher resolution images for use in 3D applications. A depth map can also be utilized to synthesize a high resolution image from one or more virtual viewpoints. In this way, a rendering device can simulate motion parallax and a dolly zoom (i.e. virtual viewpoints in front or behind the reference viewpoint). In addition to utilizing a depth map during super-resolution processing, a depth map can be utilized in a variety of post processing processes to achieve effects including (but not limited to) dynamic refocusing, generation of stereo pairs, and generation of virtual viewpoints without performing super-resolution processing. Light field image data captured by array cameras, storage of the light field image data in a light field image file, and the rendering of images using the light field image file in accordance with embodiments of the invention are discussed further below.

Array Camera Architecture

Array cameras in accordance with embodiments of the invention are configured so that the array camera software can control the capture of light field image data and can capture the light field image data into a file that can be used to render one or more images on any of a variety of appropriately configured rendering devices. An array camera including an imager array in accordance with an embodiment of the invention is illustrated in FIG. 1. The array camera 100 includes a sensor 102 having an array of focal planes 104 and which is configured to communicate with a processor 108. The processor is also configured to communicate with one or more different types of memory 110 that can be utilized to store image data and/or contain machine readable instructions utilized to configure the processor to perform processes including (but not limited to) the various processes described below. The array camera 100 also includes a display 112 that can be utilized by the processor 108 to present a user interface to a user and to display an image rendered using the light field image data. Although the processor is illustrated as a single processor, array cameras in accordance with embodiments of the invention can utilize a single processor or multiple processors including (but not limited to) a graphics processing unit (GPU).

In the illustrated embodiment, the processor receives image data generated by the sensor and reconstructs the light field captured by the sensor from the image data. The processor can manipulate the light field in any of a variety of different ways including (but not limited to) determining the depth and visibility of the pixels in the light field and synthesizing higher resolution 2D images from the image data of the light field. Sensors including multiple focal planes are discussed in U.S. patent application Ser. No. 13/106,797 entitled "Architectures for System on Chip Array Cameras", to Pain et al., the disclosure of which is incorporated herein by reference in its entirety.

In the illustrated embodiment, the focal planes are configured in a 5×5 array. Each focal plane 104 on the sensor is capable of capturing an image of the scene. The sensor elements utilized in the focal planes can be individual light sensing elements such as, but not limited to, traditional CIS (CMOS Image Sensor) pixels, CCD (charge-coupled device) pixels, high dynamic range sensor elements, multi-spectral sensor elements and/or any other structure configured to generate an electrical signal indicative of light incident on the structure. In many embodiments, the sensor elements of each focal plane have similar physical properties and receive light via the same optical channel and color filter (where present). In other embodiments, the sensor elements have different characteristics and, in many instances, the characteristics of the sensor elements are related to the color filter applied to each sensor element.

In many embodiments, an array of images (i.e. a light field) is created using the image data captured by the focal planes in the sensor. As noted above, processors 108 in accordance with many embodiments of the invention are configured using appropriate software to take the image data within the light field and synthesize one or more high resolution images. In several embodiments, the high resolution image is synthesized from a reference viewpoint, typically that of a reference focal plane 104 within the sensor 102. In many embodiments, the processor is able to synthesize an image from a virtual viewpoint, which does not correspond to the viewpoints of any of the focal planes 104 in the sensor 102. Unless all of the objects within a captured scene are a significant distance from the array camera, the images in the light field will include disparity due to the different fields of view of the focal planes used to capture the images. Processes for detecting and correcting for disparity when performing super-resolution processing in accordance with embodiments of the invention are discussed in U.S. Provisional Patent Application Ser. No. 61/691,666 (incorporated by reference above). The detected disparity can be utilized to generate a depth map. The high resolution image and depth map can be encoded and stored in memory 110 in a light field image file. The processor 108 can use the light field image file to render one or more high resolution images. The processor 108 can also coordinate the sharing of the light field image file with other devices (e.g. via a network connection), which can use the light field image file to render one or more high resolution images.

Although a specific array camera architecture is illustrated in FIG. 1, alternative architectures can also be utilized in accordance with embodiments of the invention. Systems and methods for encoding high resolution images and depth maps for storage in electronic files in accordance with embodiments of the invention are discussed below.

Capturing and Storing Light Field Image Data

Processes for capturing and storing light field image data in accordance with many embodiments of the invention involve capturing light field image data, generating a depth map from a reference viewpoint, and using the light field image data and the depth map to synthesize an image from the reference viewpoint. The synthesized image can then be compressed for storage. The depth map and additional data that can be utilized in the post processing can also be encoded as metadata that can be stored in the same container file with the encoded image.

Figure 2:
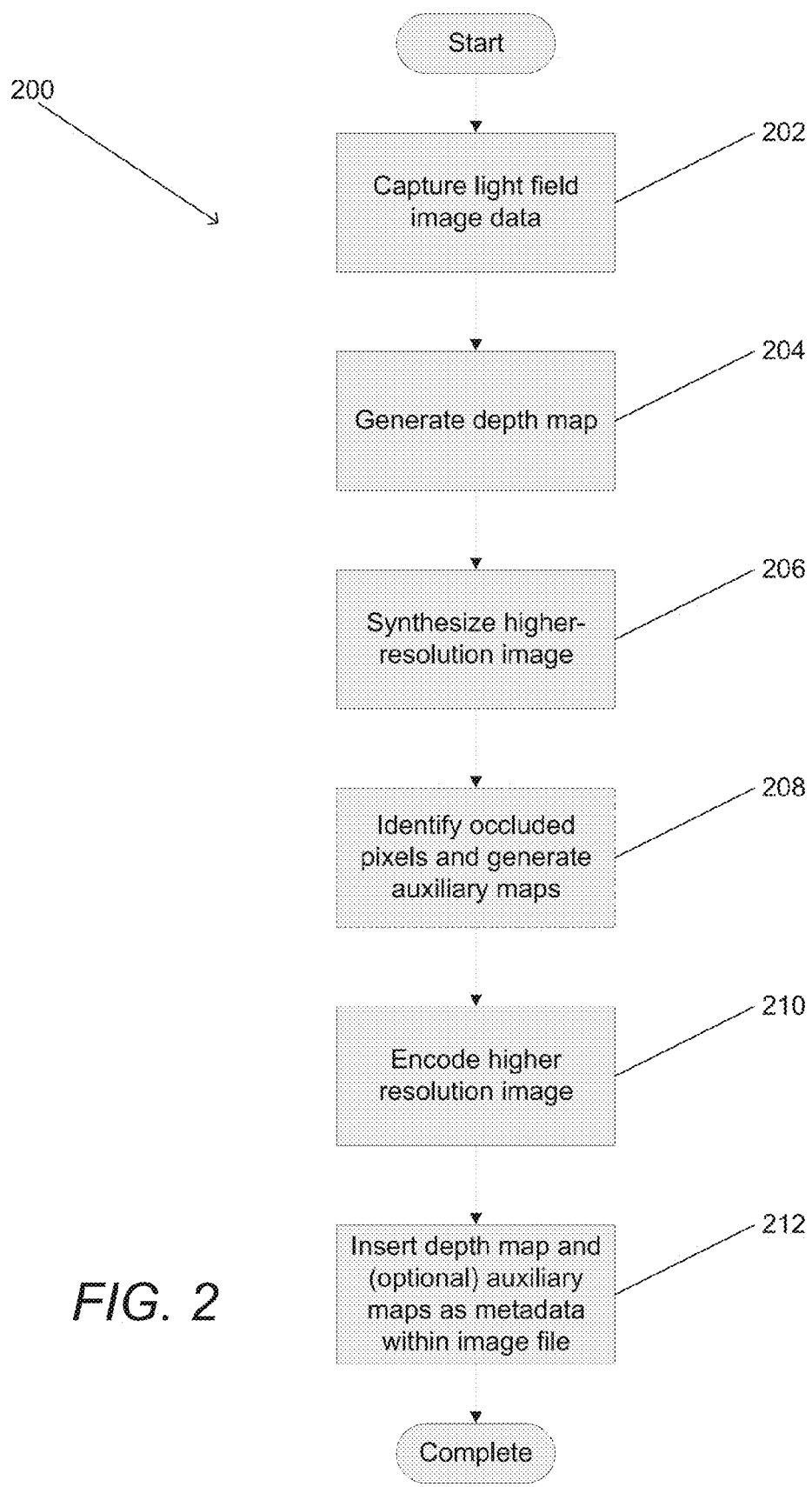
FIG. 2 is a flow chart of a process for creating a light field image file including an image synthesized from light field image data and a depth map for the synthesized image generated using the light field image data in accordance with an embodiment of the invention.

A process for capturing and storing light field image data in accordance with an embodiment of the invention is illustrated in FIG. 2. The process 200 includes capturing (202) light field image data. In several embodiments, the light field image data is captured using an array camera similar to the array cameras described above. In other embodiments, any of a variety of image capture device(s) can be utilized to capture light field image data. The light field image data is used to generate (204) a depth map. A depth map can be generated using any of a variety of techniques including (but not limited to) using any of the processes disclosed in U.S. Provisional Patent Application Ser. No. 61/691,666 or U.S. patent application Ser. No. 13/623,091 entitled "Systems and Methods for Determining Depth from Multiple Views of a Scene that Include Aliasing Using Hypothesized Fusion", to Venkataraman et al. The disclosure of U.S. patent Ser. No. 13/623,091 is incorporated by reference herein in its entirety.

The light field image data and the depth map can be utilized to synthesize (206) an image from a specific viewpoint. In many embodiments, the light field image data includes a number of low resolution images that are used to synthesize a higher resolution image using a super resolution process. In a number of embodiments, a super resolution process such as (but not limited to) any of the super resolution processes disclosed in U.S. patent application Ser. No. 12/967,807 can be utilized to synthesize a higher resolution image from the reference viewpoint.

In order to be able to perform post processing to modify the synthesized image without the original light field image data, metadata can be generated (208) from the light field image data, the synthesized image, and/or the depth map. The metadata data can be included in a light field image file and utilized during post processing of the synthesized image to perform processing including (but not limited to) refocusing the encoded image based upon a focal plane specified by the user, and synthesizing one or more images from a different viewpoint. In a number of embodiments, the auxiliary data includes (but is not limited to) pixels in the light field image data occluded from the reference viewpoint used to synthesize the image from the light field image data, one or more auxiliary maps including (but not limited to) a confidence map, an edge map, and/or a missing pixel map. Auxiliary data that is formatted as maps or layers provide information corresponding to pixel locations within the synthesized image. A confidence map is produced during the generation of a depth map and reflects the reliability of the depth value for a particular pixel. This information may be used to apply different filters in areas of the image and improve image quality of the rendered image. An edge map defines which pixels are edge pixels, which enables application of filters that refine edges (e.g. post sharpening). A missing pixel map represents pixels computed by interpolation of neighboring pixels and enables selection of post-processing filters to improve image quality. As can be readily appreciated, the specific metadata generated depends upon the post processing supported by the image data file. In a number of embodiments, no auxiliary data is included in the image data file.

In order to generate an image data file, the synthesized image is encoded (210). The encoding typically involves compressing the synthesized image and can involve lossless or lossy compression of the synthesized image. In many embodiments, the depth map and any auxiliary data are written (212) to a file with the encoded image as metadata to generate a light field image data file. In a number of embodiments, the depth map and/or the auxiliary maps are encoded. In many embodiments, the encoding involves lossless compression.

Although specific processes for encoding light field image data for storage in a light field image file are discussed above, any of a variety of techniques can be utilized to process light field image data and store the results in an image file including but not limited to processes that encode low resolution images captured by an array camera and calibration information concerning the array camera that can be utilized in super resolution processing. Storage of light field image data in JFIF files in accordance with embodiments of the invention is discussed further below.

Image Data Formats

In several embodiments, the encoding of a synthesized image and the container file format utilized to create the light field image file are based upon standards including but not limited to the JPEG standard (ISO/IEC 10918-1) for encoding a still image as a bitstream and the JFIF standard (ISO/IEC 10918-5). By utilizing these standards, the synthesized image can be rendered by any rendering device configured to support rendering of JPEG images contained within JFIF files. In many embodiments, additional data concerning the synthesized image such as (but not limited to) a depth map and auxiliary data that can be utilized in the post processing of the synthesized image can be stored as metadata associated with an Application marker within the JFIF file. Conventional rendering devices can simply skip Application markers containing this metadata. Rendering device in accordance with many embodiments of the invention can decode the metadata and utilize the metadata in any of a variety of post processing processes.

Figure 3:
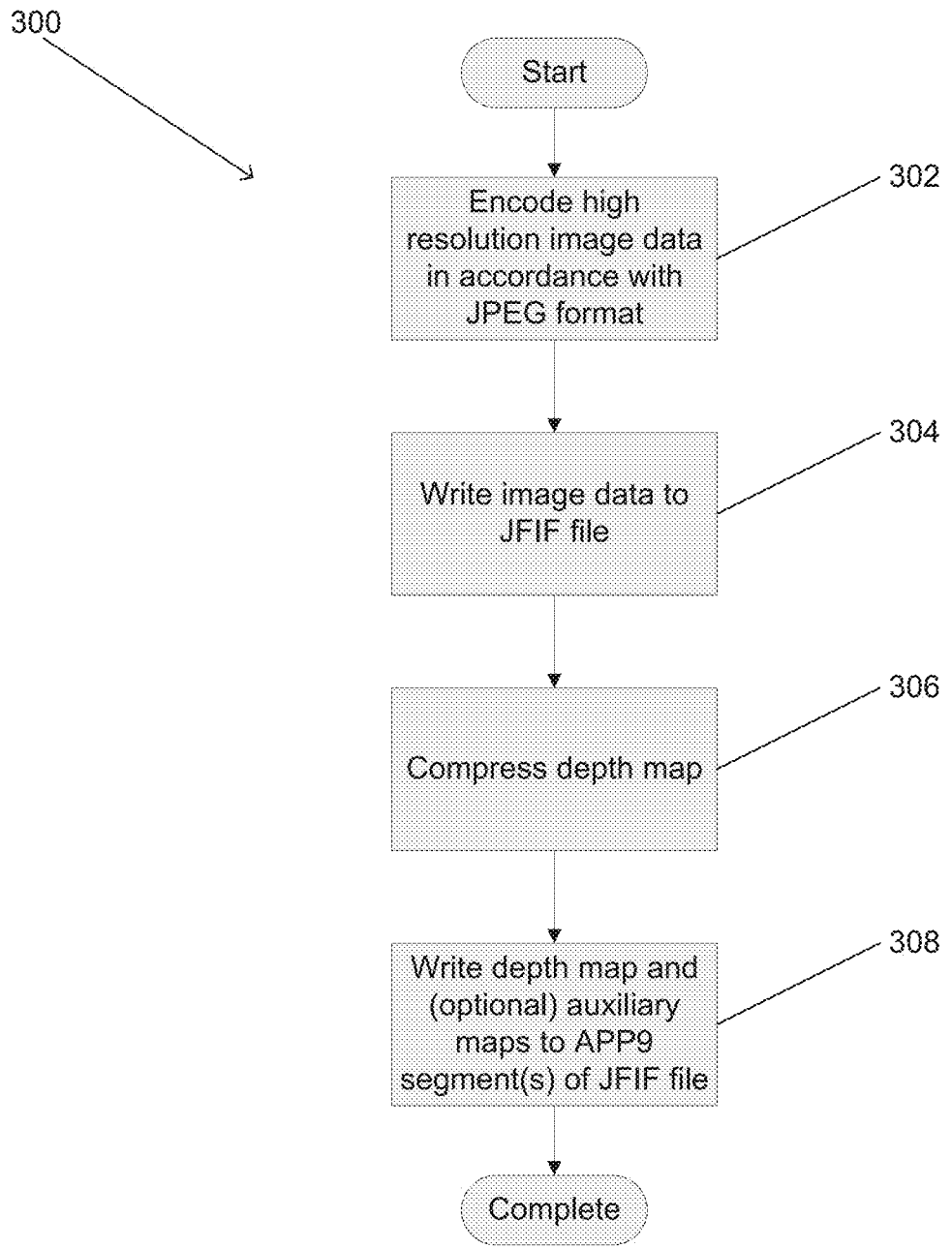
FIG. 3 is a process for creating a light field image file that conforms to the JFIF standard and that includes an image encoded in accordance with the JPEG standard in accordance with an embodiment of the invention.

A process for encoding an image synthesized using light field image data in accordance with the JPEG specification and for including the encoded image and metadata that can be utilized in the post processing of the image in a JFIF file in accordance with an embodiment of the invention is illustrated in FIG. 3. The process 300 includes encoding (302) an image synthesized from light field image data in accordance with the JPEG standard. The image data is written (304) to a JFIF file. A depth map for the synthesized image is compressed (306) and the compressed depth map and any additional auxiliary data are written (308) as metadata to an Application marker segment of the JFIF file containing the encoded image. Where the auxiliary data includes maps, the maps can also be compressed by encoding the maps in accordance with the JPEG standard. At which point, the JFIF file contains an encoded image and metadata that can be utilized to perform post processing on the encoded image in ways that utilize the additional information captured in the light field image data utilized to synthesize the high resolution image (without the need to perform super resolution processing on the underlying light field image data).

Although specific processes are discussed above for storing light field image data in JFIF files, any of a variety of processes can be utilized to encode synthesized images and additional metadata derived from the light field image data used to synthesize the encoded images in a JFIF file as appropriate to the requirements of a specific application in accordance with embodiments of the invention. The encoding of synthesized images and metadata for insertion into JFIF files in accordance with embodiments of the invention are discussed further below. Although much of the discussion that follows relates to JFIF files, synthesized images and metadata can be encoded for inclusion in a light field image file using any of a variety of proprietary or standards based encoding techniques and/or utilizing any of a variety of proprietary or standards based file formats.

Encoding Images Synthesized from Light Field Image Data

An image synthesized from light field image data using super resolution processing can be encoded in accordance with the JPEG standard for inclusion in a light field image file in accordance with embodiments of the invention. The JPEG standard is a lossy compression standard. However, the information losses typically do not impact edges of objects. Therefore, the loss of information during the encoding of the image typically does not impact the accuracy of maps generated based upon the synthesized image (as opposed to the encoded synthesized image). The pixels within images contained within files that comply with the JFIF standard are typically encoded as YCbCr values. Many array cameras synthesize images, where each pixel is expressed in terms of a Red, Green and Blue intensity value. In several embodiments, the process of encoding the synthesized image involves mapping the pixels of the image from the RGB domain to the YCbCr domain prior to encoding. In other embodiments, mechanisms are used within the file to encode the image in the RGB domain. Typically, encoding in the YCbCr domain provides better compression ratios and encoding in the RGB domain provides higher decoded image quality.

Storing Additional Metadata Derived from Light Field Image Data

The JFIF standard does not specify a format for storing depth maps or auxiliary data generated by an array camera. The JFIF standard does, however, provide sixteen Application markers that can be utilized to store metadata concerning the encoded image contained within the file. In a number of embodiments, one or more of the Application markers of a JFIF file is utilized to store an encoded depth map and/or one or more auxiliary maps that can be utilized in the post processing of the encoded image contained within the file.

Figures 4, 5:
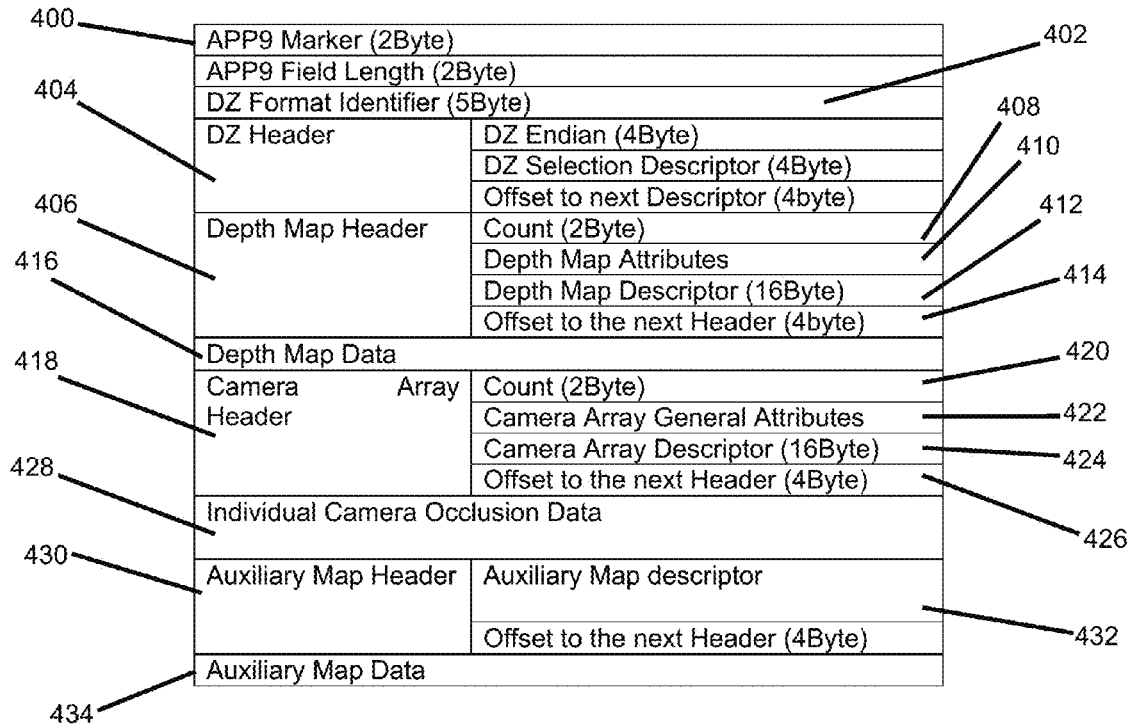
FIG. 4 illustrates an APP9 Application marker segment of a light field image file that conforms to the JFIF standard in accordance with an embodiment of the invention.
FIG. 5 illustrates a "DZ Selection Descriptor" contained within an APP9 Application marker segment of a light field image file that conforms to the JFIF standard in accordance with an embodiment of the invention.

A JFIF Application marker segment that can be utilized to store a depth map, individual camera occlusion data and auxiliary map data in accordance with an embodiment of the invention is illustrated in FIG. 4. The APP9 Application marker segment 400 uses a format identifier 402 that uniquely identifies that the Application marker segment contains metadata describing an image synthesized using light field image data. In a number of embodiments, the identifier is referred to as the "DZ Format Identifier" 402 and is expressed as the zero terminated string "PIDZ0".

The Application marker segment includes a header 404 indicated as "DZ Header" that provides a description of the metadata contained within the Application marker segment. In the illustrated embodiment, the "DZ Header" 404 includes a DZ Endian field that indicates whether the data in the "DZ Header" is big endian or little endian. The "DZ Header" 404 also includes a "DZ Selection Descriptor".

An embodiment of a "DZ Selection Descriptor" is illustrated in FIG. 5, which includes four bytes. The first two bytes (i.e. bytes 0 and 1) contain information concerning the metadata describing the encoded image that are present (see FIG. 6) and the manner in which the different pieces of metadata are compressed (see FIG. 7). In the illustrated embodiment, the types of metadata that are supported are a depth map, occluded pixel data, virtual view point data, a missing pixel map, a regular edge map, a silhouette edge map, and/or a confidence map. In other embodiments, any of a variety of metadata describing an encoded image obtained from the light field image data used to synthesize the image can be included in the metadata contained within a JFIF file in accordance with an embodiment of the invention. In many instances, the metadata describing the encoded image can include maps that can be considered to be monochrome images that can be encoded using JPEG encoding. In a number of embodiments, the maps can be compressed using lossless JPEG LS encoding. In several embodiments, the maps can be compressed using lossy JPEG encoding. Utilizing JPEG encoding to compress the maps reduces the size of the maps and enables rendering devices to leverage a JPEG decoder to both decode the image contained within the JFIF file and the maps describing the encoded image. The third byte (i.e. byte 2) of the "DZ Selection Descriptor" indicates the number of sets of metadata describing the encoded image that are contained within the Application marker segment and the fourth byte is reserved. Although specific implementations of the header 404 describing the metadata contained within the Application marker segment are illustrated in FIGS. 4-7, any of a variety of implementations can be utilized to identify the maps describing the synthesized image that are present within the metadata contained within an light field image file as appropriate to the requirements of the application in accordance with embodiments of the invention.

Depth Map

Referring back to FIG. 4, the Application marker segment also includes a "Depth Map Header" 406 that describes depth map 416 included within the Application marker segment. The "Depth Map Header"406 includes an indication 408 of the size of "Depth Map Attributes" 410 included within the "Depth Map Header", the "Depth Map Attributes" 410, and a "Depth Map Descriptor" 412. As noted above, the depth map 416 can be considered to be a monochrome image and lossless or lossy JPEG encoding can be utilized to compress the "Depth Map Data" included in a JFIF file.

A "Depth Map Attributes" table in accordance with an embodiment of the invention is illustrated in FIG. 8 and includes information concerning the manner in which the depth map should be used to render the encoded image. In the illustrated embodiment, the information contained within the "Depth Map Attributes" table includes the focal plane and the F# of the synthetic aperture to utilize when rendering the encoded image. Although specific pieces of information related to the manner in which the depth map can be utilized to render the encoded image are illustrated in FIG. 8, any of a variety of pieces of information appropriate to the requirements of a specific application can be utilized in accordance with embodiments of the invention.

A "Depth Map Descriptor" in accordance with an embodiment of the invention is illustrated in FIG. 9 and includes metadata describing the depth map. In the illustrated embodiment, the "Depth Map Descriptor" includes a zero terminated identifier string "PIDZDH0" and version information. In other embodiments, any of a variety of pieces of information appropriate to the specific requirements of particular applications can be utilized in accordance with embodiments of the invention.

A JFIF Application marker segment is restricted to 65,533 bytes. However, an Application marker can be utilized multiple times within a JFIF file. Therefore, depth maps in accordance with many embodiments of the invention can span multiple APPS Application marker segments. The manner in which depth map data is stored within an Application marker segment in a JFIF file in accordance with an embodiment of the invention is illustrated in FIG. 10. In the illustrated embodiment, the depth map data is contained within a descriptor that is uniquely identified using the "PIDZDD0" zero terminated string. The descriptor also includes the length of the descriptor and depth map data.

Although specific implementations of a depth map and header describing a depth map within an Application marker segment of a JFIF file are illustrated in FIGS. 4, 8, 9, and 10, any of a variety of implementations can be utilized to include a depth map describing an encoded image within a JFIF file as appropriate to the requirements of the application in accordance with embodiments of the invention.

Occlusion Data

Referring back to FIG. 4, the Application marker segment also includes a "Camera Array Header" 418 that describes occlusion data 428 for individual cameras within an array camera that captured the light field image data utilized to synthesize the image contained within the light field image file. The occlusion data can be useful in a variety of post processing processes including (but not limited) to process that involve modifying the viewpoint of the encoded image. The "Camera Array Header" 418 includes an indication 420 of the size of a "Camera Array General Attributes" table 422 included within the "Camera Array Header", the "Camera Array General Attributes" table 422, and a "Camera Array Descriptor" 424.

A "Camera Array General Attributes" table in accordance with an embodiment of the invention is illustrated in FIG. 11 and includes information describing the number of cameras and dimensions of a camera array utilized to capture the light field image data utilized to synthesize the image encoded within the JFIF file. In addition, the "Camera Array General Attributes" table can indicate a reference camera position within the array and/or a virtual view position within the array. The "Camera Array General Attributes" table also provides information concerning the number of cameras within the array for which occlusion data is provided within the JFIF file.

A "Camera Array Descriptor" in accordance with an embodiment of the invention is illustrated in FIG. 12 and includes metadata describing the individual camera occlusion data contained within the JFIF file. In the illustrated embodiment, the "Camera Array Descriptor" includes a zero terminated identifier string "PIDZAH0" and version information. In other embodiments, any of a variety of pieces of information appropriate to the specific requirements of particular applications can be utilized in accordance with embodiments of the invention.

In many embodiments, occlusion data is provided on a camera by camera basis. In several embodiments, the occlusion data is included within a JFIF file using an individual camera descriptor and an associated set of occlusion data. An individual camera descriptor that identifies a camera and identifies the number of occluded pixels related to the identified camera described within the JFIF file in accordance with an embodiment of the invention is illustrated in FIG. 13. In the illustrated embodiment, the descriptor is identified using the "PIDZCD0" zero terminated string. The descriptor also includes a camera number that can be utilized to identify a camera within an array camera that captured light field image data utilized to synthesize the encoded image contained within the JFIF file. In addition, the descriptor includes the number of occluded pixels described in the JFIF file and the length (in bytes) of the data describing the occluded pixels. The manner in which the occluded pixel data can be described in accordance with embodiments of the invention is illustrated in FIG. 14. The same descriptor "PDIZCD0" is used to identify the occluded pixel data and the descriptor also includes the number of pixels of occluded data contained within the segment, the length of the data in bytes and an offset to the next marker in addition to the occluded pixel data. Due to the restriction on Application marker segments not exceeding 65,533 bytes in data, the additional information enables a rendering device to reconstruct the occluded pixel data across multiple APP9 application marker segments within a JFIF file in accordance with embodiments of the invention.

A table describing an occluded pixel that can be inserted within a JFIF file in accordance with an embodiment of the invention is illustrated in FIG. 15. The table includes the depth of the occluded pixel, the pixel color of the occluded pixel and the pixel coordinates. In the illustrated embodiment, the pixel color is illustrated as being in the RGB domain. In other embodiments, the pixel color can be expressed in any domain including the YCbCr domain.

Although specific implementations for storing information describing occluded pixel depth within an Application marker segment of a JFIF file are illustrated in FIGS. 4, 13, 14, and 15, any of a variety of implementations can be utilized to include occluded pixel information within a JFIF file as appropriate to the requirements of the application in accordance with embodiments of the invention.

Auxiliary Maps

Referring back to FIG. 4, any of a variety of auxiliary maps can be included in an Application marker segment within a JFIF file in accordance with an embodiment of the invention. The total number of auxiliary maps and the types of auxiliary maps can be indicated in the Application marker segment. Each auxiliary map can be expressed using an "Auxiliary Map Descriptor" 432 and "Auxiliary Map Data" 434. In the illustrated embodiment, the "Auxiliary Map Descriptor" 432 is included in an "Auxiliary Map Header" 430 within the Application marker segment in the JFIF file.

An "Auxiliary Map Descriptor" that describes an auxiliary map contained within a light field image file in accordance with an embodiment of the invention is illustrated in FIG. 16. The "Auxiliary Map Descriptor" includes an identifier, which is the "PIDZAM0" zero terminated string and information specifying the type of auxiliary map and number of bits per pixel in the map. As noted above, any of a variety of auxiliary maps derived from light field image data used to synthesize an encoded image can be included within a JFIF file in accordance with embodiments of the invention. In the illustrated embodiment, confidence maps, silhouette edge maps, regular edge maps, and missing pixel maps are supported.

"Auxiliary Map Data" stored in a JFIF file in accordance with an embodiment of the invention is conceptually illustrated in FIG. 17. The "Auxiliary Map Data" uses the same "PDIZAD0" zero terminated string identifier and includes the number of pixels of the auxiliary map contained within the segment, the length of the data in bytes and an offset to the next marker in addition to pixels of the auxiliary map. Due to the restriction on Application marker segments not exceeding 65,533 bytes in data, the additional information enables a rendering device to reconstruct the auxiliary map describing the encoded image across multiple APPS application marker segments within a JFIF file.

Although specific implementations for storing auxiliary maps within an Application marker segment of a JFIF file are illustrated in FIGS. 4, 16, and 17, any of a variety of implementations can be utilized to include auxiliary map information within a JFIF file as appropriate to the requirements of the application in accordance with embodiments of the invention. Various examples of auxiliary maps that can be utilized to provide additional information concerning an encoded image based upon the light field image data utilized to synthesize the encoded image in accordance with embodiments of the invention are discussed below.

Confidence Maps

A confidence map can be utilized to provide information concerning the relative reliability of the information at a specific pixel location. In several embodiments, a confidence map is represented as a complimentary one bit per pixel map representing pixels within the encoded image that were visible in only a subset of the images used to synthesize the encoded image. In other embodiments, a confidence map can utilize additional bits of information to express confidence using any of a variety of metrics including (but not limited to) a confidence measure determined during super resolution processing, or the number of images in which the pixel is visible.

Edge Maps

A variety of edge maps can be provided included (but not limited to) a regular edge map and a silhouette map. A regular edge map is a map that identifies pixels that are on an edge in the image, where the edge is an intensity discontinuity. A silhouette edge maps is a map that identifies pixels that are on an edge, where the edge involves an intensity discontinuity and a depth discontinuity. In several embodiments, each can be expressed as a separate one bit map or the two maps can be combined as a map including two pixels per map. The bits simply signal the presence of a particular type of edge at a specific location to post processing processes that apply filters including (but not limited to) various edge preserving and/or edge sharpening filters.

Missing Pixel Maps

A missing pixel map indicates pixel locations in a synthesized image that do not include a pixel from the light field image data, but instead include an interpolated pixel value. In several embodiments, a missing pixel map can be represented using a complimentary one bit per pixel map. The missing pixel map enables selection of post-processing filters to improve image quality. In many embodiments, a simple interpolation algorithm can be used during the synthesis of a higher resolution from light field image data and the missing pixels map can be utilized to apply a more computationally expensive interpolation process as a post processing process. In other embodiments, missing pixel maps can be utilized in any of a variety of different post processing process as appropriate to the requirements of a specific application in accordance with embodiments of the invention.

Rendering Images Using Light Field Imaging Files

Figure 18:
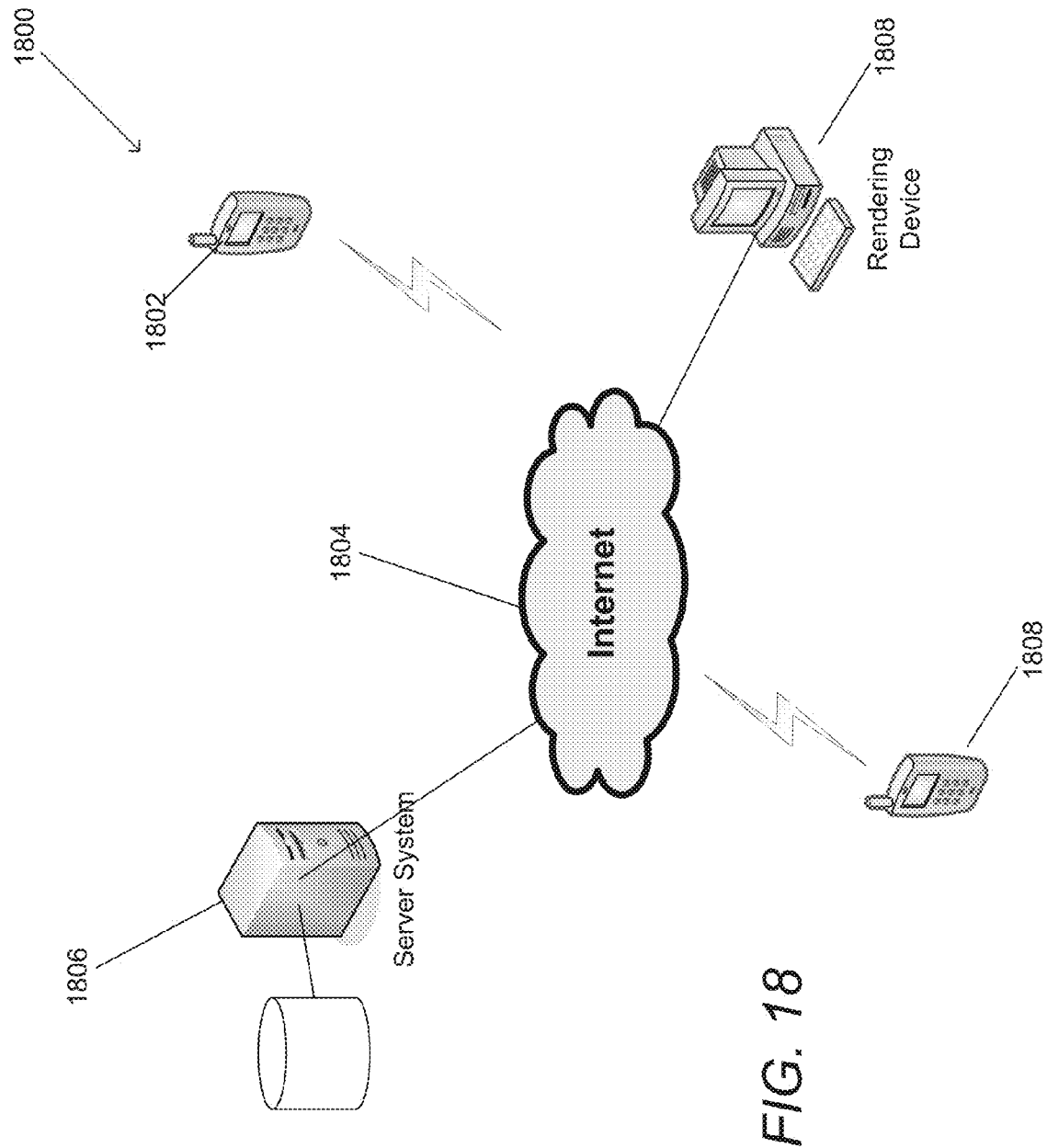
FIG. 18 illustrates a network including at least one encoding device configured to capture light field image data and encode light field image files and to share the light field image file with rendering devices via a network in accordance with an embodiment of the invention.

When light field image data is encoded in a light field image file, the light field image file can be shared with a variety of rendering devices including but not limited to cameras, mobile devices, personal computers, tablet computers, network connected televisions, network connected game consoles, network connected media players, and any other device that is connected to the Internet and can be configured to display images. A system for sharing light field image files in accordance with an embodiment of the invention is illustrated in FIG. 18. The system 1800 includes a mobile device 1802 including an array camera configured to capture light field image data and encode the light field image data in a light field image file. The mobile device 1802 also includes a network interface that enables the transfer of a light field image file to other rendering devices via the Internet 1804. In several embodiments, the light field image file is transferred with the assistance of a server system 1806 that can either store the light field image file for access by other devices or relay the light field image file to other rendering devices. In many embodiments, the server system 1806 provides a user interface that enables users to modify the rendering of the image provided to the device. In several embodiments, the server system 1806 provides the light field image file to a device for rendering. In the illustrated embodiment, a variety of network connected rendering devices 1808 are illustrated including a mobile phone and a personal computer. In other embodiments, any of a variety of network connected and/or disconnected devices can render images using a light field image file in accordance with embodiments of the invention. Rendering devices and processes for rendering images in accordance with embodiments of the invention are discussed further below.

Rendering Devices

A rendering device in accordance with embodiments of the invention typically includes a processor and a rendering application that enables the rendering of an image based upon a light field image data file. The simplest rendering is for the rendering device to decode the encoded image contained within the light field image data file. More complex renderings involve applying post processing to the encoded image using the metadata contained within the light field image file to perform manipulations including (but not limited to) modifying the viewpoint of the image and/or modifying the focal plane of the image.

Figure 19:
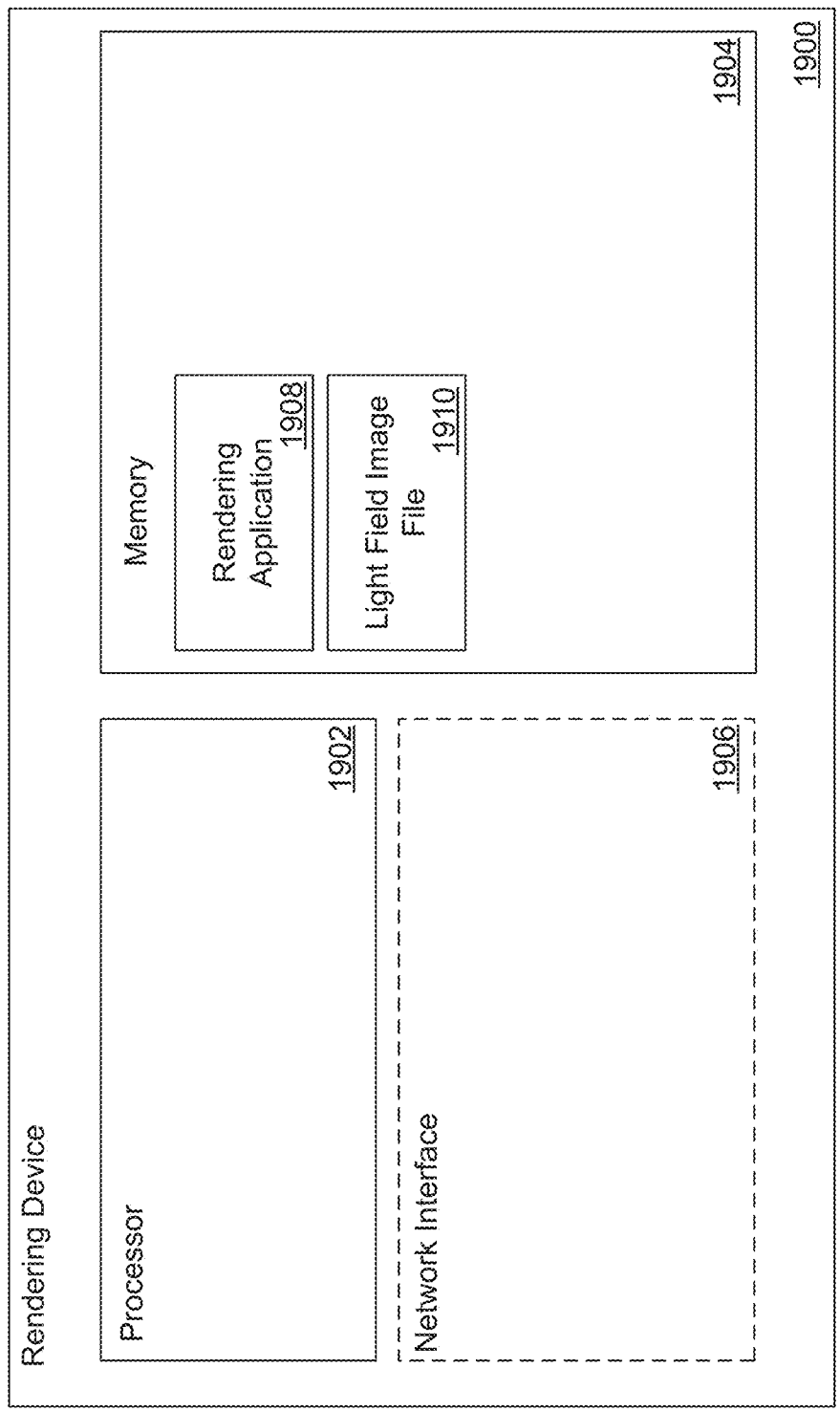
FIG. 19 conceptually illustrates a rendering device configured by a rendering application to render an image using a light field image file.

A rendering device in accordance with an embodiment of the invention is illustrated in FIG. 19. The rendering device 1900 includes a processor 1902, memory 1904, and an optional network interface 1906. The memory contains a rendering application 1908 that is used to configure the microprocessor to render images for display using a light field image file 1910. In the illustrated embodiment, the light field image file is shown stored in memory. In other embodiments, the light field image file can be stored in an external storage device. Although a specific rendering device is illustrated in FIG. 19, any of a variety of rendering devices can be utilized in accordance with embodiments of the invention including (but not limited to) the types of devices that are customarily used to display images using image files. Processes for rendering of images using light field image files in accordance with embodiments of the invention are discussed further below.

Processes for Rendering Images Using Light Field Image Files

Figure 20:
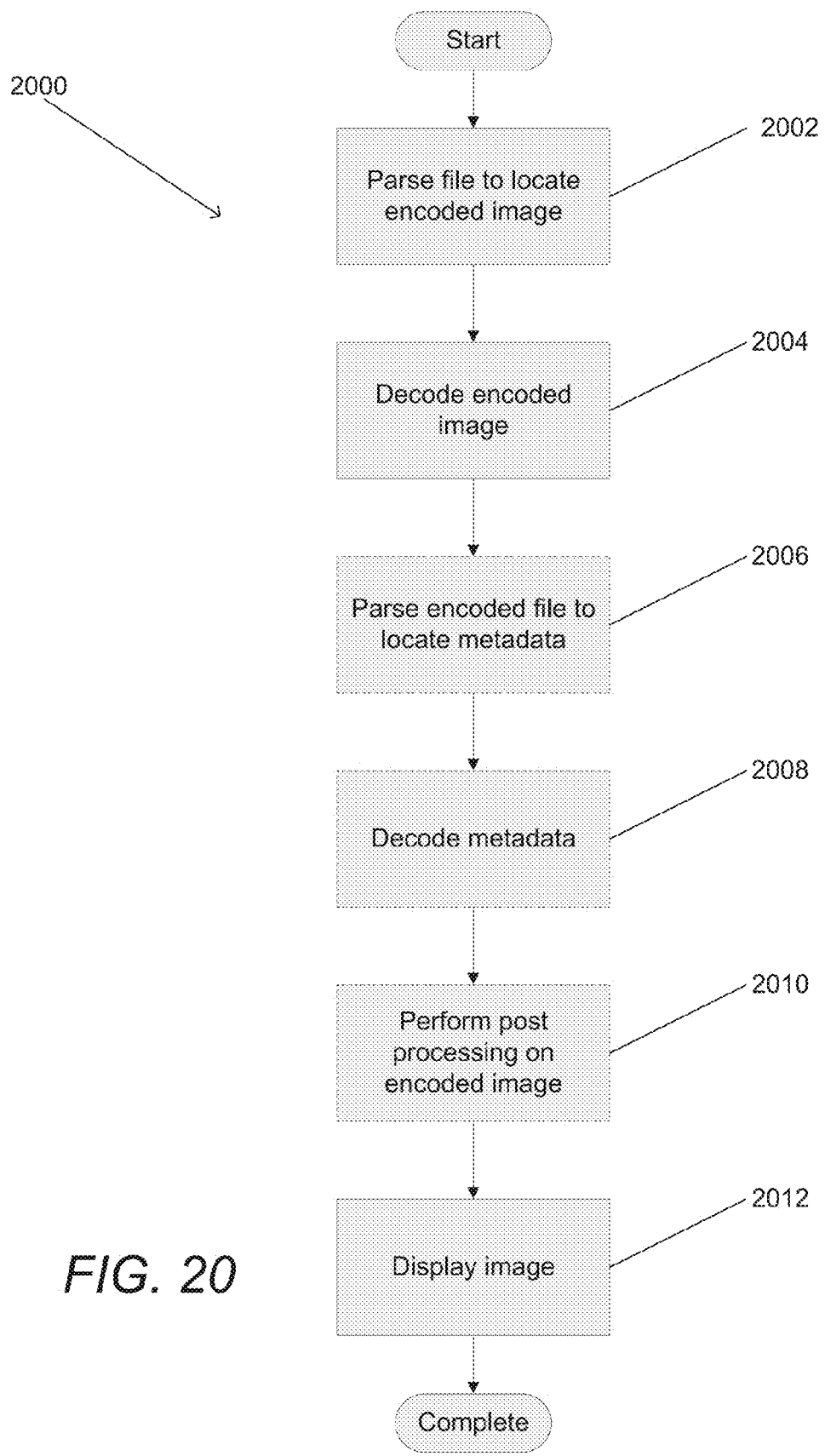
FIG. 20 is a flow chart illustrating a process for rendering an image using a light field image file in accordance with an embodiment of the invention.

As noted above, rendering a light field image file can be as simple as decoding an encoded image contained within the light field image file or can involve more complex post processing of the encoded image using metadata derived from the same light field image data used to synthesize the encoded image. A process for rendering a light field image in accordance with an embodiment of the invention is illustrated in FIG. 20. The process 2000 includes parsing (2002) the light field image file to locate the encoded image contained within the image file. The encoded image file is decoded (2004). As noted above, the image can be encoded using a standards based encoder and so the decoding process can utilize a standards based codec within a rendering device, or the image can be encoded using a proprietary encoding and a proprietary decoder is provided on the rendering device to decode the image. When the process for rendering the image simply involves rendering the image, the decoded image can be displayed. When the process for rendering the image includes post processing, the image file is parsed (2006) to locate metadata within the file that can be utilized to perform the post processing. The metadata is decoded (2008). The metadata can often take the form of maps that can be encoded using standards based image encoders and a standards based decoder present on the rendering device can be utilized to decode the metadata. In other embodiments, a proprietary decoding process is utilized to decode the metadata. The metadata can then be used to perform (2010) the post processing of the encoded image and the image can be displayed (2012). The display of the image can be local. Alternatively the image can be streamed to a remote device or encoded as an image and provided to a remote device for display.

Although specific processes for rendering an image from a light field image file are discussed with reference to FIG. 20, any of a variety of processes appropriate to the requirements of a specific application can be utilized to render an image for display using a light field image file in accordance with an embodiment of the invention. As noted above, any of a variety of standards based encoders and decoders can be utilized in the encoding and decoding of light field image files in accordance with embodiments of the invention. Processes for rendering images using light field image files that conform to the JFIF standard and include an image and/or metadata encoded in accordance with the JPEG standard are discussed further below.

Rendering Images Using JFIF Light Field Image Files

The ability to leverage deployed JPEG decoders can greatly simplify the process of rendering light field images. When a light field image file conforms to the JFIF standard and the image and/or metadata encoded within the light field image file is encoded in accordance with the JPEG standard, a rendering application can leverage an existing implementation of a JPEG decoder to render an image using the light field image file. Similar efficiencies can be obtained where the light field image file includes an image and/or metadata encoded in accordance with another popular standard for image encoding.

Figure 21:
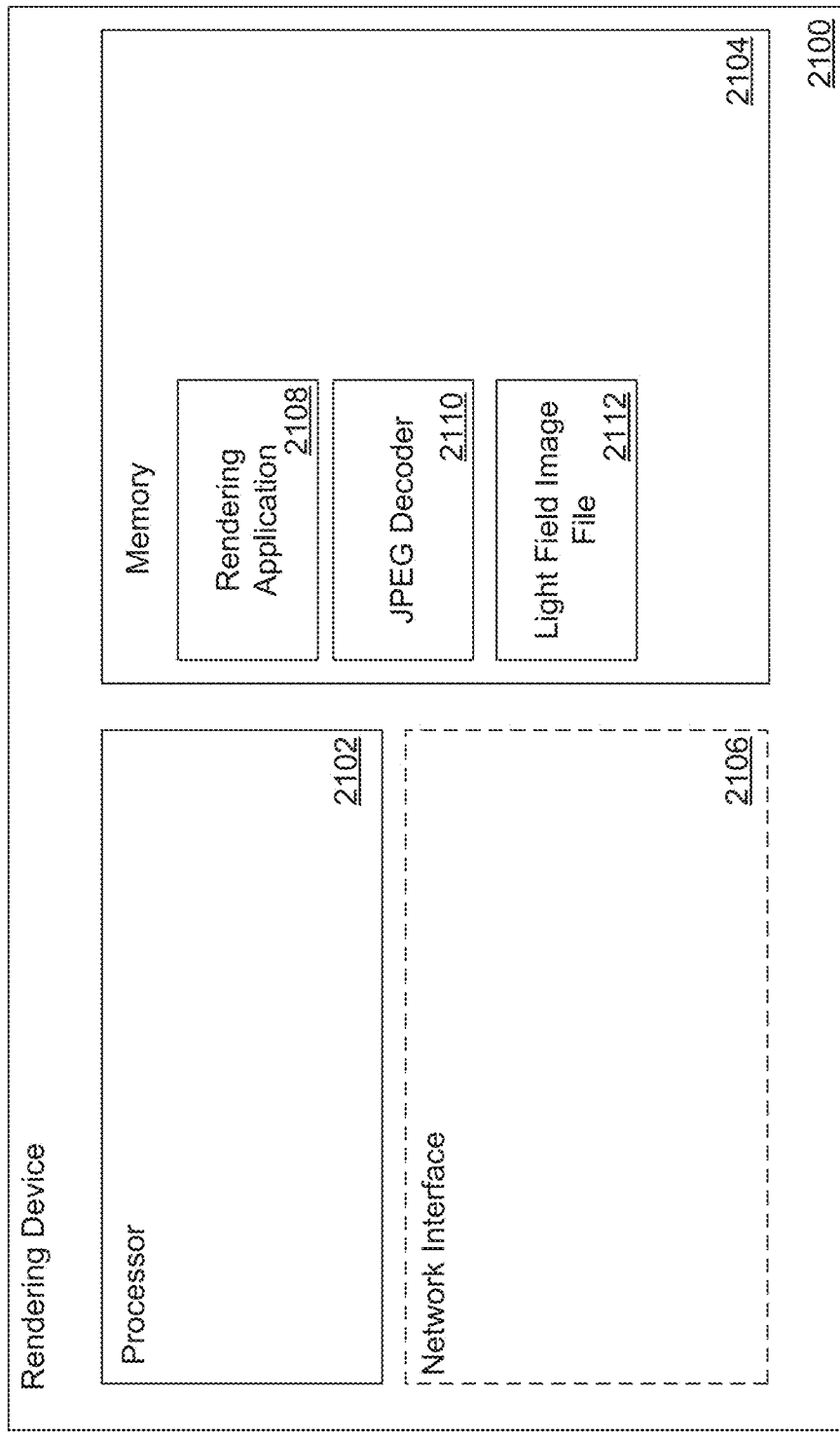
FIG. 21 conceptually illustrates a rendering device configured by a rendering application to render an image using a light field image file containing an image and/or a map encoded in accordance with the JPEG standard.

A rendering device configured by a rendering application to render an image using a light field image file in accordance with an embodiment of the invention is illustrated in FIG. 21. The rendering device 2100 includes a processor 2102, memory 2104, and an optional network interface 2106 that can be utilized to receive light field image files. In the illustrated embodiment, the memory 2104 of the rendering device 2100 includes a rendering application 2108, a JPEG decoder application 2110, and a light field image file 2112 that contains at least one image and/or metadata encoded in accordance with the JPEG standard. The rendering application 2108 configures the processor to parse the light field image file to locate an encoded image and to decode the encoded image using the JPEG decoder application 2110. Similarly, the rendering application can configure the processor to parse the light field image file to locate metadata and to decode encoded maps contained within the metadata using the JPEG decoder.

Although specific rendering devices including JPEG decoders are discussed above with reference to FIG. 21, any of a variety of rendering devices incorporating standards based decoders can be utilized to render images from appropriately encoded light field image files in accordance with embodiments of the invention. Processes for decoding light field image files that confirm with the JFIF standard and that contain at least one image and/or metadata encoded in accordance with the JPEG standard in accordance with embodiments of the invention are discussed further below.

Processes for Rendering Images from JFIF Light Field Image Files

Processes for rending images using light field image files that conform to the JFIF standard can utilize markers within the light field image file to identify encoded images and metadata. Headers within the metadata provide information concerning the metadata present in the file and can provide offset information or pointers to the location of additional metadata and/or markers within the file to assist with parsing the file. Once appropriate information is located a standard JPEG decoder implementation can be utilized to decode encoded images and/or maps within the file.

Figure 22:
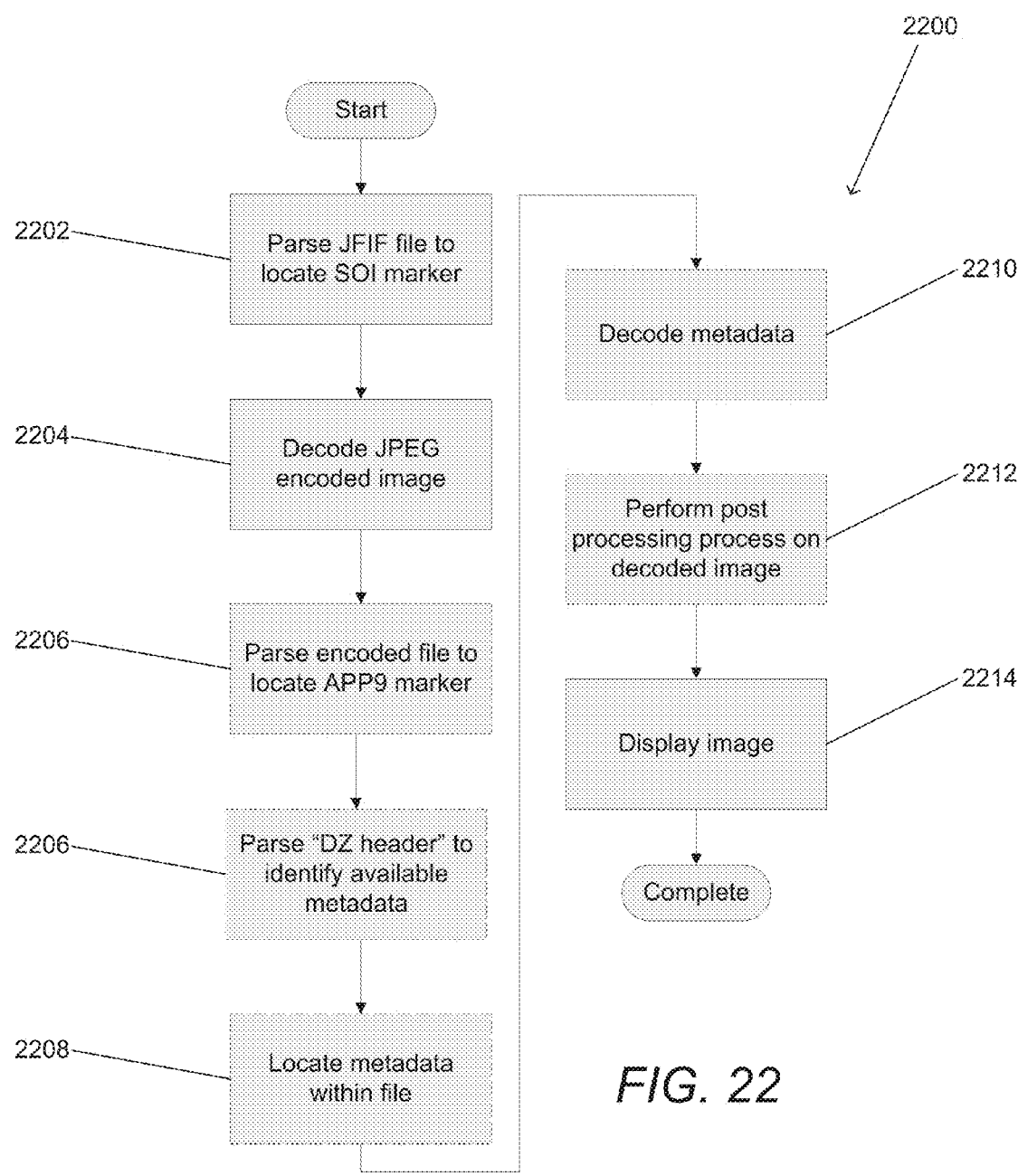
FIG. 22 is a flow chart illustrating a process for rendering an image using a light field image file that conforms to the JFIF standard and includes an image encoded in accordance with the JPEG standard and metadata describing the encoded image.

A process for displaying an image rendered using a light field image file that conforms to the JFIF standard using a JPEG decoder in accordance with an embodiment of the invention is illustrated in FIG. 22. The process 2200 involves parsing (2202) the light field image file to locate a Start of Image (SOI) Marker. The SOI marker is used to locate an image file encoded in accordance with the JPEG format. The encoded image can be decoded (2204) using a JPEG decoder. When no post processing of the decoded image is desired, the image can simply be displayed. Where post processing of the image is desired (e.g, to change the view point of the image and/or the focal plane of the image), the process parses (2206) the light field image file to locate an appropriate Application marker. In the illustrated embodiment, an APP9 marker indicates the presence of metadata within the light field image file. The specific metadata within the file can be determined by parsing (2206) a header within the APP9 Application marker segment that describes the metadata within the file. In the illustrated embodiment, the header is the "DZ Header" within the APP9 Application marker segment. The information within the metadata header can be utilized to locate (2208) specific metadata utilized in a post processing process within the light field image file. In instances where the metadata is encoded, the metadata can be decoded. In many embodiments, metadata describing an encoded image within a light field image file is in the form of a map that provides information concerning specific pixels within an encoded image contained within the light field image file and JPEG encoding is used to compress the map. Accordingly, a JPEG decoder can be utilized to decode the map. The decoded metadata can be utilized to perform (2212) a post processes the decoded image. The image can then be displayed (2214). In many embodiments, the image is displayed on a local display. In a number of embodiments, the image is streamed to a remote display or encoded as an image and forwarded to a remote device for display.

Although specific processes for displaying images rendered using light field image files are discussed above with respect to FIG. 22, any of a variety of processes for parsing a light field image file and decoding images and/or metadata encoded in accordance with the JPEG standard using a JPEG decoder can be utilized in accordance with embodiments of the invention. Much of the discussion above references the use of metadata derived from light field image data and contained within a light field image file to perform post processing processes on an encoded image synthesized from the light field image data. Post processing of images synthesized from light field image data using metadata obtained using the light field image data in accordance with embodiments of the invention are discussed further below.

Post Processing of Images Using Metadata Derived from Light Field Image Data

Images can be synthesized from light field image data in a variety of ways. Metadata included in light field image files in accordance with embodiments of the invention can enable images to be rendered from a single image synthesized from the light field image data without the need to perform super resolution processing. Advantages of rendering images in this way can include that the process of obtaining the final image is less processor intensive and less data is used to obtain the final image. However, the light field image data provides rich information concerning a captured scene from multiple viewpoints. In many embodiments, a depth map and occluded pixels from the light field image data (i.e. pixels that are not visible from the reference viewpoint of the synthesized image) can be included in a light field image file to provide some of the additional information typically contained within light field image data. The depth map can be utilized to modify the focal plane when rendering an image and/or to apply depth dependent effects to the rendered image. The depth map and the occluded pixels can be utilized to synthesize images from different viewpoints. In several embodiments, additional maps are provided (such as, but not limited to, confidence maps, edge maps, and missing pixel maps) that can be utilized when rendering alternative viewpoints to improve the resulting rendered image. The ability to render images from different viewpoints can be utilized to simply render an image from a different viewpoint. In many embodiments, the ability to render images from different viewpoints can be utilized to generate a stereo pair for 3D viewing. In several embodiments, processes similar to those described in U.S. Provisional Patent Application Ser. No. 61/707,691, entitled "Synthesizing Images From Light Fields Utilizing Virtual Viewpoints" to Jain (the disclosure of which is incorporated herein by reference in its entirety) can be utilized to modify the viewpoint based upon motion of a rendering device to create a motion parallax effect. Processes for rendering images using depth based effects and for rendering images using different viewpoints are discussed further below.

Rendering Images Using Depth Based Effects

Figure 23:
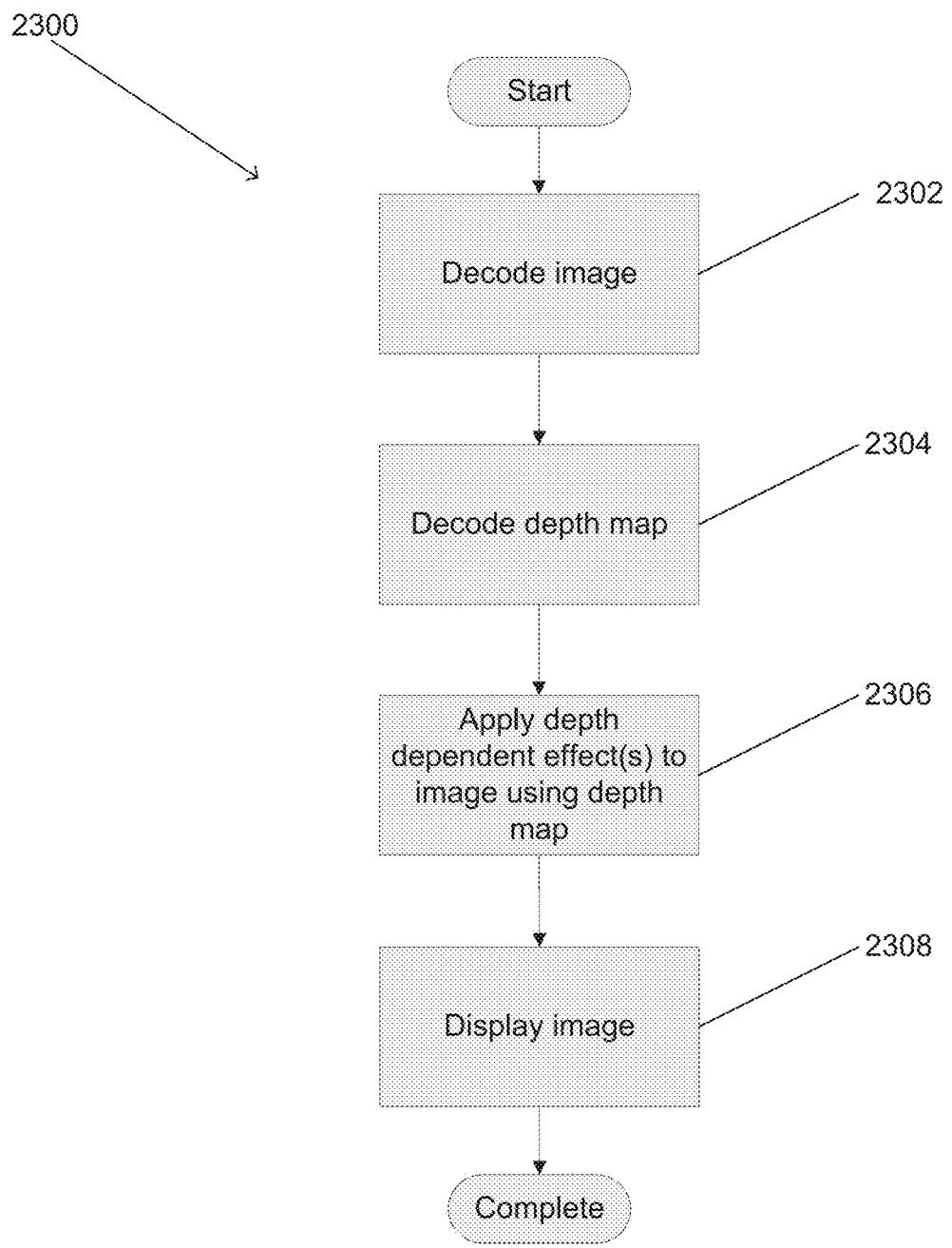
FIG. 23 is a flow chart illustrating a process applying depth dependent effects to an encoded image contained within the light field image file based upon a depth map contained within the light field image file in accordance with an embodiment of the invention.

A variety of depth based effects can be applied to an image synthesized from light field image data in accordance with embodiments of the invention including (but not limited to) applying dynamic refocusing of an image, locally varying the depth of field within an image, selecting multiple in focus areas at different depths, and/or applying one or more depth related blur model. A process for applying depth based effects to an image synthesized from light field image data and contained within a light field image file that includes a depth map in accordance with an embodiment of the invention is illustrated in FIG. 23. The process 2300 includes decoding (2302) an image synthesized from light field image data contained within a light field image file. In addition, a depth map derived from the light field image data that describes the synthesized image is also decoded (2304) from metadata contained within the light field image file. One or more depth dependent effects can then be applied (2406) to the pixels of the decoded image based upon the depths of the pixels indicated by the depth map. In a number of embodiments, the depth dependent effects are automatically determined by modifying the focal plane, and/or F number (which provides different depths of fields and degree of blur in out-of-focus regions). The image can then be displayed (2308). In many embodiments, the image is displayed on a local display. In a number of embodiments, the image is streamed to a remote display or encoded as an image and forwarded to a remote device for display.

Although specific processes for applying depth dependent effects to an image synthesized from light field image data using a depth map obtained using the light field image data are discussed above with respect to FIG. 23, any of a variety of processes can be utilized for extracting an image and a depth map from a light field image file and for using the depth map to apply one or more depth dependent effects in accordance with embodiments of the invention. Processes for rendering images from different viewpoints to the reference viewpoint of an image contained within a light field image file based upon a depth map and information concerning occluded pixels contained within the light field image file in accordance with embodiments of the invention are discussed further below.

Rendering Images Using Different Viewpoints

One of the compelling aspects of computational imaging is the ability to use light field image data to synthesize images from different viewpoints. The ability to synthesize images from different viewpoints creates interesting possibilities including the creation of stereo pairs for 3D applications and the simulation of motion parallax as a user interacts with an image. Light field image files in accordance with many embodiments of the invention can include an image synthesized from light field image data from a reference viewpoint, a depth map for the synthesized image and information concerning pixels from the light field image data that are occluded in the reference viewpoint. A rendering device can use the information concerning the depths of the pixels in the synthesized image and the depths of the occluded images to determine the appropriate shifts to apply to the pixels to shift them to the locations in which they would appear from a different viewpoint. Occluded pixels from the different viewpoint can be identified and locations on the grid of the different viewpoint that are missing pixels can be identified and hole filling can be performed using interpolation of adjacent non-occluded pixels. In many embodiments, the quality of an image rendered from a different viewpoint can be increased by providing additional information in the form of auxiliary maps that can be used to refine the rendering process. In a number of embodiments, auxiliary maps can include confidence maps, edge maps, and missing pixel maps. Each of these maps can provide a rendering process with information concerning how to render an image based on customized preferences provided by a user. In other embodiments, any of a variety of auxiliary information including additional auxiliary maps can be provided as appropriate to the requirements of a specific rendering process.

Figure 24:
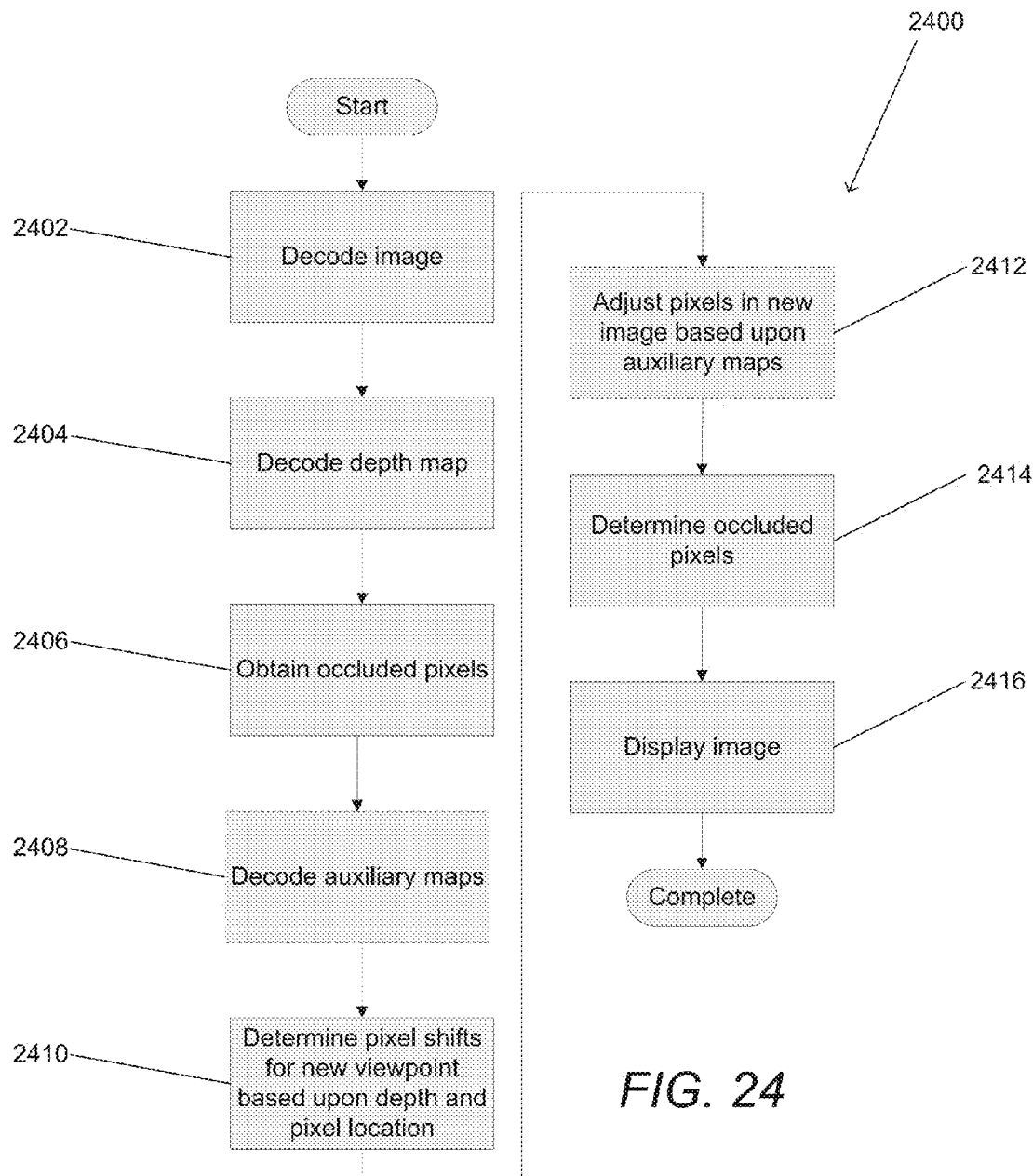
FIG. 24 is a flow chart illustrating a process for rendering an image from a different viewpoint to a reference viewpoint of an image contained within a light field image file in accordance with an embodiment of the invention.

A process for rendering an image from a different viewpoint using a light field image file containing an image synthesized using light field image data from a reference viewpoint, a depth map describing the depth of the pixels of the synthesized image, and information concerning occluded pixels in accordance with an embodiment of the invention is illustrated in FIG. 24. The process 2400 includes decoding (2402) an image contained within a light field image file, where the image is an image synthesized from light field image data. The process also includes decoding (2404) a depth map from the light field image file, where the depth map was also obtained from the light field image data used to synthesize the encoded image. Information concerning pixels from the light field image data that are occluded in the reference viewpoint is also obtained (2405) from the light field image file, where the information includes the location and depth of the occluded pixels from the reference viewpoint. In many embodiments, auxiliary information, including auxiliary maps that specify additional information concerning the pixels in the encoded image, is also contained within the light field image file and auxiliary information useful in the rendering of an image from a different viewpoint to the reference viewpoint can be extracted and decoded (2408) from the light field image file. Using the depth map and the depths of the occluded pixels, shifts in the location and depths of pixels in the different viewpoint can be determined (2410). Based upon the shifts, occluded pixels can be determined (2414) and the image displayed. Where auxiliary information is available, the auxiliary information can be utilized to adjust (2412) the pixels in the image prior to rendering. In many embodiments, the adjustments are performed prior to identifying occluded pixels and displaying the final image. In a number of embodiments, the adjustments are performed after occluded pixels are identifies.

Although specific processes for rendering an image from a different viewpoint using an image synthesized from a reference view point using light field image data, a depth map obtained using the light field image data, and information concerning pixels in the light field image data that are occluded in the reference viewpoint are discussed above with respect to FIG. 24, any of a variety of processes can be utilized for rendering images from different viewpoints using a light field image file as appropriate to the requirements of specific applications in accordance with embodiments of the invention. Processes for rendering images simulating different lens characteristics from in accordance with embodiments of the invention are discussed further below.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed:

1. A system for rendering image files containing depth maps, the system comprising:
   a display;
   a processor; and
   a memory containing a rendering application and an image file comprising:
      a reference encoded image from a reference viewpoint; and
      metadata describing at least one supplementary encoded image taken from a supplementary viewpoint using at least one supplementary camera stored as metadata within the image file; and
      metadata describing a depth map based on the parallax variation between the encoded reference image and the at least one encoded supplementary image that specifies depths from the reference viewpoint for pixels in the encoded reference image;
   wherein the rendering application directs the processor to:
      locate the reference image within the image file;
      synthesize an image based on the reference image and the depth map;
      render the synthesized image; and
      display the synthesized image using the display.

2. The system of claim 1, wherein:
   the rendering application further configures the processor to synthesize a virtual viewpoint using the reference viewpoint and the at least one supplementary viewpoint; and
   the synthesized image is further based on the virtual viewpoint such that the displayed synthesized image appears to have been taken from the virtual viewpoint.

3. The system of claim 1, wherein the metadata is located within an Application marker segment within the image file.

4. The system of claim 3, wherein the Application marker segment is identified using the APP9 marker.

5. The system of claim 3, wherein the depth map is encoded in accordance with the JPEG standard using lossless compression.

6. The system of claim 1, wherein the metadata further comprises pixels that are occluded by the reference viewpoint.

7. The system of claim 1, wherein the metadata further describes an Auxiliary Map Data.

8. The system of claim 1, wherein the metadata further describes a confidence map.

9. The system of claim 1, wherein the metadata further describes an edge map.

10. The system of claim 1, wherein the metadata further describes a missing pixel map.

11. The system of claim 1, wherein the rendering application further directs the processor to determine the boundary between foreground objects and a background in the reference image using the depth map.

12. The system of claim 11, wherein the rendering application further directs the processor to apply a blur effect to the determined background in the reference image.

13. The system of claim 1, wherein the reference encoded image is taken from the reference viewpoint using a reference camera.

14. The system of claim 13, wherein the reference image is stored in metadata within the image file.

15. The system of claim 1, wherein the rendering application further directs the processor to store the synthesized image in the image file.

16. The system of claim 1, wherein:
   the reference encoded image is taken from a reference viewpoint using a reference camera;
   the reference image is stored in metadata within the image file; and
   the rendering application further directs the processor to store the synthesized image in the image file.

17. A system for storing image files containing depth maps, the system comprising:
   a display;
   a processor;
   an array camera comprising a plurality of cameras; and
   a memory containing a rendering application and an image file comprising:
      a stereo pair of encoded images comprising:
         a reference encoded image from a reference viewpoint; and
         a supplementary encoded image from a supplementary viewpoint;
         wherein the supplementary encoded image is taken by a camera in the plurality of cameras; and
         wherein the supplementary encoded image is stored as metadata within the image file; and
      metadata describing a depth map based on the parallax variation between the reference encoded image and the at least one supplementary encoded image that specifies depths from the reference viewpoint for pixels in the encoded reference image;

wherein the rendering application directs the processor to:
- locate the reference encoded image within the image file;
- synthesize an image based on the reference encoded image and the depth map;
- render the synthesized image; and
- display the synthesized image using the display.

18. The system of claim 17, wherein the reference encoded image is taken by a camera in the plurality of cameras from the reference viewpoint.

19. The system of claim 17, wherein the reference encoded image is in the RGB domain, and the rendering application further directs the processor to convert the supplementary encoded image to the YCbCr domain.

20. The system of claim 17, wherein a first camera in the plurality of cameras has a different field of view from a second camera in the plurality of cameras.

21. The system of claim 17, wherein the rendering application further directs the processor to store the synthesized image in the image file.

22. The system of claim 17, wherein the reference encoded image is taken from a reference viewpoint using a reference camera.

23. The system of claim 17, wherein the reference image is stored in metadata within the image file.

24. The system of claim 17, wherein the rendering application further directs the processor to store the synthesized image in the image file.

25. The system of claim 17, wherein:
- the reference encoded image is taken from a reference viewpoint using a reference camera;
- the reference image is stored in metadata within the image file; and
- the rendering application further directs the processor to store the synthesized image in the image file.

* * * * *